US012756866B2

(12) United States Patent
Ponnusamy et al.

(10) Patent No.: US 12,756,866 B2
(45) Date of Patent: Oct. 6, 2026

(54) VIDEO PIXEL THROUGHPUT SCALABILITY ARCHITECTURE BASED ON BITRATE

(71) Applicant: QUALCOMM Incorporated, San Diego, CA (US)

(72) Inventors: Naveen Kumar Ponnusamy, Bangalore (IN); Shengqi Yang, Carlsbad, CA (US); Kishore Chamarthi, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 111 days.

(21) Appl. No.: 18/968,382

(22) Filed: Dec. 4, 2024

(65) Prior Publication Data

US 2026/0230652 A1 Aug. 6, 2026

(51) Int. Cl.
*H04N 19/70* (2014.01)
*H04N 19/117* (2014.01)
*H04N 19/13* (2014.01)

(52) U.S. Cl.
CPC ........... *H04N 19/70* (2014.11); *H04N 19/117* (2014.11); *H04N 19/13* (2014.11)

(58) Field of Classification Search
None
See application file for complete search history.

(56) References Cited

U.S. PATENT DOCUMENTS

2002/0090142 A1* 7/2002 Igarashi ............... H04N 19/423 382/246
2010/0202241 A1* 8/2010 Park ......................... G11C 8/08 365/194
2012/0086587 A1 4/2012 Sze et al.
2014/0105272 A1 4/2014 Bulusu et al.
2016/0171641 A1* 6/2016 Jeon ....................... H04N 19/70 345/501
2016/0301945 A1* 10/2016 Saito ...................... H04N 19/91
2017/0163986 A1* 6/2017 Jacobson ............. H04N 19/105
2018/0098083 A1 4/2018 Mcallister
2021/0044828 A1* 2/2021 Pham Van ........... H04N 19/179
2021/0321137 A1* 10/2021 Egilmez ............... H04N 19/186
2024/0129471 A1 4/2024 Sze et al.
2026/0019596 A1* 1/2026 Yang .................... H04N 19/127

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Iwata K., et al., "A 342 mW Mobile Application Processor With Full-HD Multi-Standard Video Codec and Tile-Based Address-Translation Circuits", IEEE, Journal of Solid-state Circuits, vol. 45, No. 1, Jan. 2010, pp. 59-68.

* cited by examiner

*Primary Examiner* — Fabio S Lima
(74) *Attorney, Agent, or Firm* — Shumaker & Sieffert, P.A.

(57) ABSTRACT

An apparatus for coding video data includes a video syntax processing (VSP) engine and at least one video pixel processing (VPP) engine. The VSP engine processes video data at a syntax element level, while the VPP engine processes video data at a pixel level. A controller determines the bitrate of a video coding session and adjusts the power or clock speed of the VPP engine based on the bitrate.

20 Claims, 15 Drawing Sheets

VIDEO PIXEL THROUGHPUT SCALABILITY ARCHITECTURE BASED ON BITRATE

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Extended reality (XR) applications, including virtual reality (VR), mixed reality (MR), and augmented reality (AR), demand significant processing power from video hardware. These applications often involve multiple video decoding and encoding sessions, such as separate streams for left and right eyes, alpha channels, and depth buffers. The requirement for real-time rendering and low-latency encoding and decoding with high quality may result in low compression ratios and high bitrates.

SUMMARY

In general, this disclosure describes techniques for video encoding and decoding, including techniques for reducing power consumption in a video encoder and/or video decoder. In some examples, video codec cores may include two main processing engines: a video syntax processing (VSP) engine, and one or more video pixel processing engine (VPP) engines. The VSP engine may be configured to encode and decode syntax elements and includes processing engines to perform arithmetic coding, such as context adaptive binary arithmetic coding (CABAC). The VPP engine may be configured for pixel processing and may include engines for transforms, prediction, filtering, and other processes at the pixel level. In some examples, the power for each of the VSP engine and the VPP engine may be controlled individually in a video coding system. That is, the VSP engine and the VPP engine may be independently powered on and off.

This disclosure describes techniques that include controlling one or more of the power and/or clock speed of at least one VPP engine (e.g., of a plurality of parallel VPP engines) based on the bitrate of a video coding session. By assessing the bitrate, the system optimizes the number of active VPP engines and/or the clock speed of one or more VPP engines, to the processing speed of the VSP engine, thereby reducing power consumption without sacrificing performance.

One advantage of this approach is the independent control of the power state of one or more VPP engines. This flexibility allows the system to align the processing capabilities of the VSP engine and VPP engines, ensuring efficient resource utilization. In high-bitrate scenarios, where the VSP engine might become a bottleneck, the system can deactivate unnecessary VPP engines, leading to power savings.

The techniques of this disclosure may be particularly beneficial for applications that benefit from low latency and high-quality video, such as extended reality (XR) and video conferencing. By dynamically scaling the VPP engines, the video coding system maintains throughput and latency requirements while minimizing power usage. This results in a more efficient video coding process, which is beneficial for mobile and battery-powered devices. The techniques of this disclosure may also lower thermal operating temperature for video coding devices.

The disclosed techniques provide a scalable solution that adapts to varying video bitrates, enhancing energy efficiency. This adaptability not only improves user experience in demanding applications but also extends the operational life of devices by conserving power.

In one example, this disclosure describes an apparatus configured to code video data, the apparatus comprising a VSP engine configured to process the video data at a syntax element level, at least one VPP engine configured to process the video data at a pixel level, and a controller configured to determine a bitrate of a video coding session, and control one or more of a power or a clock speed of the at least one VPP engine based on the bitrate of the video coding session.

In another example, this disclosure describes a method for coding video data, the method comprising determining a bitrate of a video coding session, processing the video data at a syntax element level using a VSP engine at the bitrate, processing the video data at a pixel level using at least one VPP engine, and controlling one or more of a power or a clock speed of the at least one VPP engine based on the bitrate of the video coding session.

The details of one or more examples are set forth in the accompanying drawings and the description below. Other features, objects, and advantages will be apparent from the description, drawings, and claims.

DETAILED DESCRIPTION

Extended reality (XR) applications, including virtual reality (VR), mixed reality (MR), and augmented reality (AR), demand significant processing power from video encoding and decoding hardware. These applications often involve multiple video decoding and encoding sessions, such as separate streams for left and right eyes, alpha channels, and depth buffers. The requirement for real-time rendering and low-latency encoding and decoding with high quality may result in low compression ratios and high bitrates. This creates a challenge in efficiently managing hardware resources to maintain performance while minimizing power consumption.

Current solutions often struggle with high bitrate demands of some video coding applications. As described above, video hardware typically includes a bitstream processing engine (e.g., a VSP engine) and multiple pixel processing pipes (e.g., a plurality of VPP engines). The performance of the VSP engine is determined by bitrate, while the performance of a VPP engine is determined by pixel throughput. In many cases, the VSP engine becomes a bottleneck due to high bitrates, leading to underutilization of VPP engines. This inefficiency results in unnecessary power consumption, as all VPP engines may remain active, even when not required.

The techniques of this disclosure address these challenges by dynamically adjusting the number of active VPP engines based on the bitrate of a video coding session. By calculating the number of VPP engines needed to match the throughput of the VSP engine, a video coding system can deactivate unnecessary VPP engines, thereby reducing power consumption. Additionally, in non-parallel architectures (e.g., only one VPP engine), the video coding system may scale the clock speed of both the VSP engine and the VPP engine according to their processing speed ratio, further optimizing power usage. The techniques of this disclosure better ensures efficient resource utilization, particularly in high-bitrate scenarios, enhancing both performance and energy efficiency.

Figure 1:
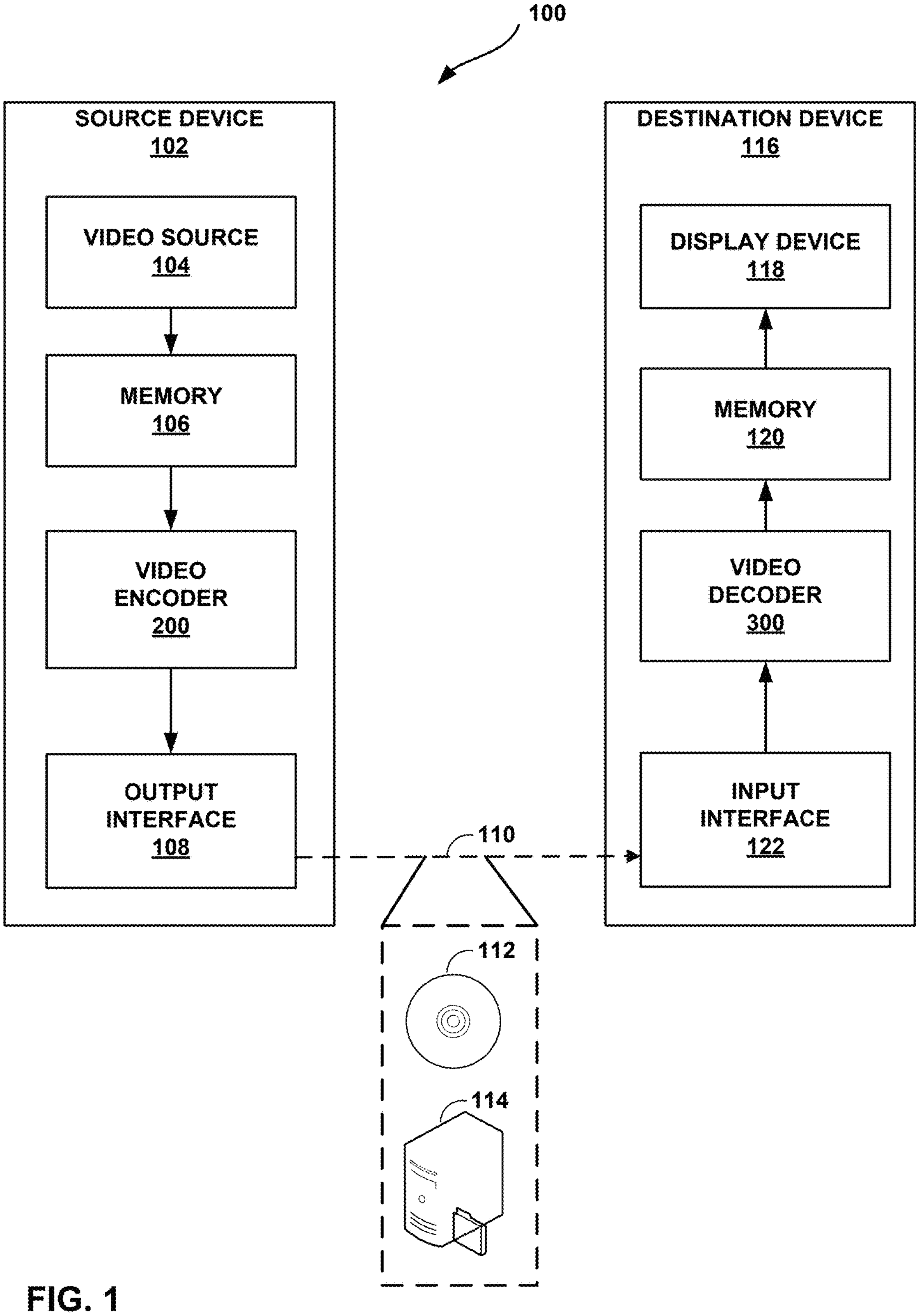
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to architectures for coding (encoding and/or decoding) video data. In general, video data includes any data for processing a video. Thus, video data may include raw, unencoded video, encoded video, decoded (e.g., reconstructed) video, depth buffers, alpha channels, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as VR headsets, AR glasses, head mounted displays (HMDs), smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding video data using independently power controlled syntax and pixel processing engines. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding video data using independently power controlled syntax and pixel processing engines. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, XR real-time gaming, split rendering, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), real-time transport protocol (RTP), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

As will be described in more detail below, video encoder 200 and video decoder 300 may each include a VSP engine and one or more VPP engines. Video encoder 200 and video decoder 300 may each include a controller that may, among other things, independently control the on/off power state of the VSP engine and the VPP engine. In general, the VSP engine may be configured to process video data at the syntax element level, and may perform tasks such as entropy coding (e.g., CABAC). The VPP may be configured to process video data at the pixel level, and may perform task such as transform, prediction, and filtering.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that code video data using independently power controlled syntax and pixel processing engines.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions. Video data may further include depth channels and/or alpha channels, which are not visual YUV channels, but may be interpreted as Y channels for coding purposes. In other examples, YUV video data may be combined with other 2D non-visual data that can benefit from video coding.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where Mis not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks.

Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As will be explained in more detail below, this disclosure describes techniques for video encoding and decoding, including techniques for reducing power consumption in video encoder 200 and/or video decoder 300. In some examples, video codec cores in video encoder 200 and video decoder 300 may include two main processing engines: a video syntax processing (VSP) engine, and one or more video pixel processing engine (VPP) engines. The VSP engine may be configured to encode and decode syntax elements and includes processing engines to perform arithmetic coding, such as context adaptive binary arithmetic coding (CABAC). In other examples, the VSP engine may perform other types of arithmetic coding, such as context adaptive variable length coding (CAVLC) or non-binary arithmetic coding. The techniques of this disclosure may be used with any VSP engine performing any type of arithmetic coding or coding of syntax elements. The VPP engine may be configured for pixel processing and may include engines for transforms, prediction, filtering, and other processes at the pixel level. In some examples, the power for each of the VSP engine and the VPP engine may be controlled individually in a video coding system. That is, the VSP engine and the VPP engine may be independently powered on and off. In addition, the clock speed of the VSP and VPP engine may be controlled individually.

In a high bitrate video coding scenario, the VSP engine may become the performance bottleneck. As such, one or more VPP pipes may be underutilized (e.g., unnecessarily turned on while not processing pixel data). This presents an opportunity to save power for power hungry video coding use cases.

This disclosure describes techniques that include controlling one or more of the power and/or clock speed of at least one VPP engine (e.g., of a plurality of parallel VPP engines) based on the bitrate of a video coding session. By assessing the bitrate, a controller of video encoder 200 and/or video decoder 300 may optimize the number of active VPP engines and/or the clock speed of one or more VPP engines, to the processing speed of the VSP engine, thereby reducing power consumption without sacrificing performance.

In one example, based on the bitrate of video sessions, for a parallel architecture with multiple of VPP engines, the number of VPP engines that match the VSP engine throughput can be calculated, and only those many VPP engines are turned on to save power. For a non-parallel architecture, the frequency of one or more of a VSP engine and VPP engine may be scaled according to their processing speed ratio and consequently, dynamic power is reduced.

Figure 2:
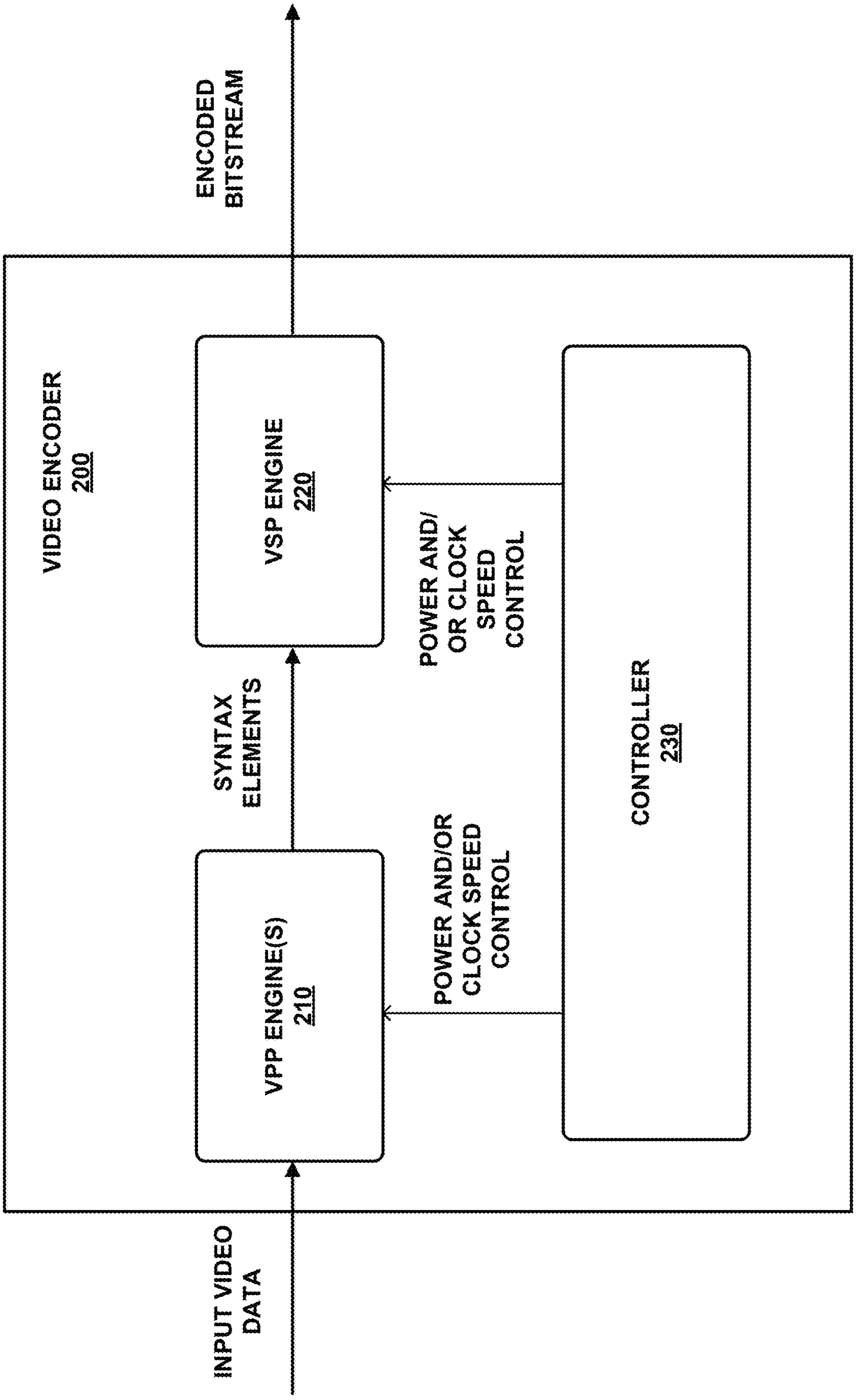
FIG. 2 is a block diagram illustrating an example video encoder that may perform the techniques of this disclosure.

FIG. 2 is a block diagram illustrating an example video encoder that may perform the techniques of this disclosure. In the example of FIG. 2, video encoder 200 includes one or more VPP engine(s) 210, VSP engine 220, and controller 230. The one or more VPP engine(s) 210 are configured to process input video data (e.g., frames of video data). In some examples, video encoder 200 may include a plurality of VPP engines, where the plurality of VPP engines may be configured to operate on video data of a frame in parallel. For example, each VPP engine may operate on an LCU row of video data. In other examples, video encoder 200 may include a single VPP engine (e.g., in a non-parallel architecture).

As mentioned above, VPP engine(s) 210 may process video data at the pixel level. As such, the processing speed of VPP engine(s) 210 may be described as a pixel rate (e.g., MPps, M Pixels per second). VPP engine(s) 210 may perform pixel level video encoding processes described above, such as prediction, transformation, quantization, filtering, and related processing for reconstructing reference frames. The output of VPP engine(s) 210 is syntax elements.

VSP engine 220 takes the syntax elements as input and compresses the syntax elements to produce an encoded video bitstream. VSP engine 220 may compress the syntax elements using CABAC, other entropy coding techniques, and/or fixed probability encoding techniques. VSP engine 220 operates on the bit or "bin" level. The processing speed of VSP engine 220 engine is typically measured in terms of a bitrate (e.g., Mbps, M bits per second). Again, VSP engine 220 is typically configured to operate at a faster speed than VPP engine 210. VPP engine(s) 210 and VSP engine 220 may exchange data through one or more memories or buffers, including faster on-chip buffers, or buffers in external memory (e.g., double data rate (DDR) RAM).

Video encoder 200 may further include a controller 230 configured to control the power state and/or clock speed of VPP engine 210 and VSP engine 220. Controller 230 may operate according to firmware and/or may execute a software driver. As described above, controller 230 may be configured to independently power on and off any of VPP engine(s) 210 and VSP engine 220. The techniques described below focus on how controller 230 may control the power and/or clock speed of VPP engine(s) 210 to match the processing speed of VSP engine 220, thus saving power.

Figure 3:
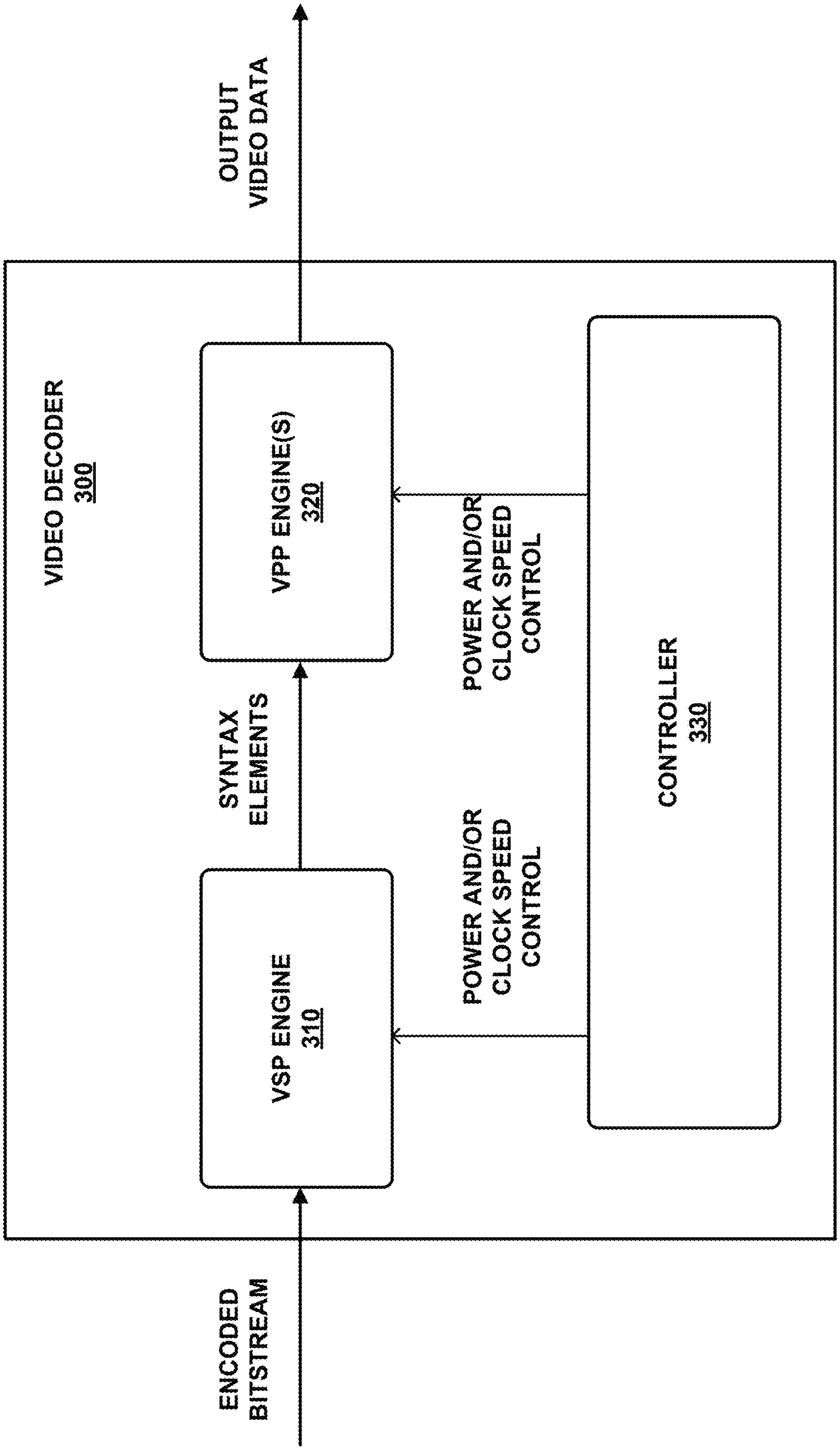
FIG. 3 is a block diagram illustrating an example video decoder that may perform the techniques of this disclosure.

FIG. 3 is a block diagram illustrating an example video decoder that may perform the techniques of this disclosure.

Video decoder 300 perform the inverse operation of video encoder 200 of FIG. 2. In the example of FIG. 3, video decoder 300 includes VSP engine 310, VPP engine(s) 320, and controller 330. VSP engine 310 is configured to process an encoded video bitstream to produce syntax elements. That is, VSP engine 310 may perform entropy decoding, such as CABAC decoding, to recover the syntax elements encoded in the encoded video bitstream. Again, like VSP engine 220 of FIG. 2, VSP engine 310 operates on the bit or "bin" level. The processing speed of VSP engine 310 engine is typically measured in terms of a bitrate (e.g., Mbps, M bits per second).

VPP engine(s) 210 may perform pixel level video decoding processes described above, such as prediction, inverse transformation, dequantization, filtering. The output of VPP engine(s) 320 is output video data in the form of decoded frames. In some examples, video decoder 300 may include a plurality of VPP engines, where the plurality of VPP engines may be configured to operate on video data of a frame in parallel. For example, each VPP engine may operate on an LCU row of video data. In other examples, video encoder 200 may include a single VPP engine (e.g., in a non-parallel architecture).

VPP engine(s) 320 may process video data at the pixel level. As such, the processing speed of VPP engine(s) 320 may be described as a pixel rate (e.g., MPps, M Pixels per second). Again, VSP engine 310 is typically configured to operate at a faster speed than VPP engine(s) 320. VPP engine(s) 320 and VSP engine 310 may exchange data through one or more memories or buffers, including faster on-chip buffers, or buffers in external memory (e.g., double data rate (DDR) RAM).

Video decoder 300 may further include a controller 330 configured to control the power state and/or clock speed of VPP engine(s) 320 and VSP engine 310. Controller 330 may operate according to firmware and/or may execute a software driver. As described above, controller 330 may be configured to independently power on and off VPP engine 320 and VSP engine 310. The techniques described below focus on how controller 330 may control the power and/or clock speed of VPP engine(s) 320 to match the processing speed of VSP engine 310, thus saving power.

Figure 4:
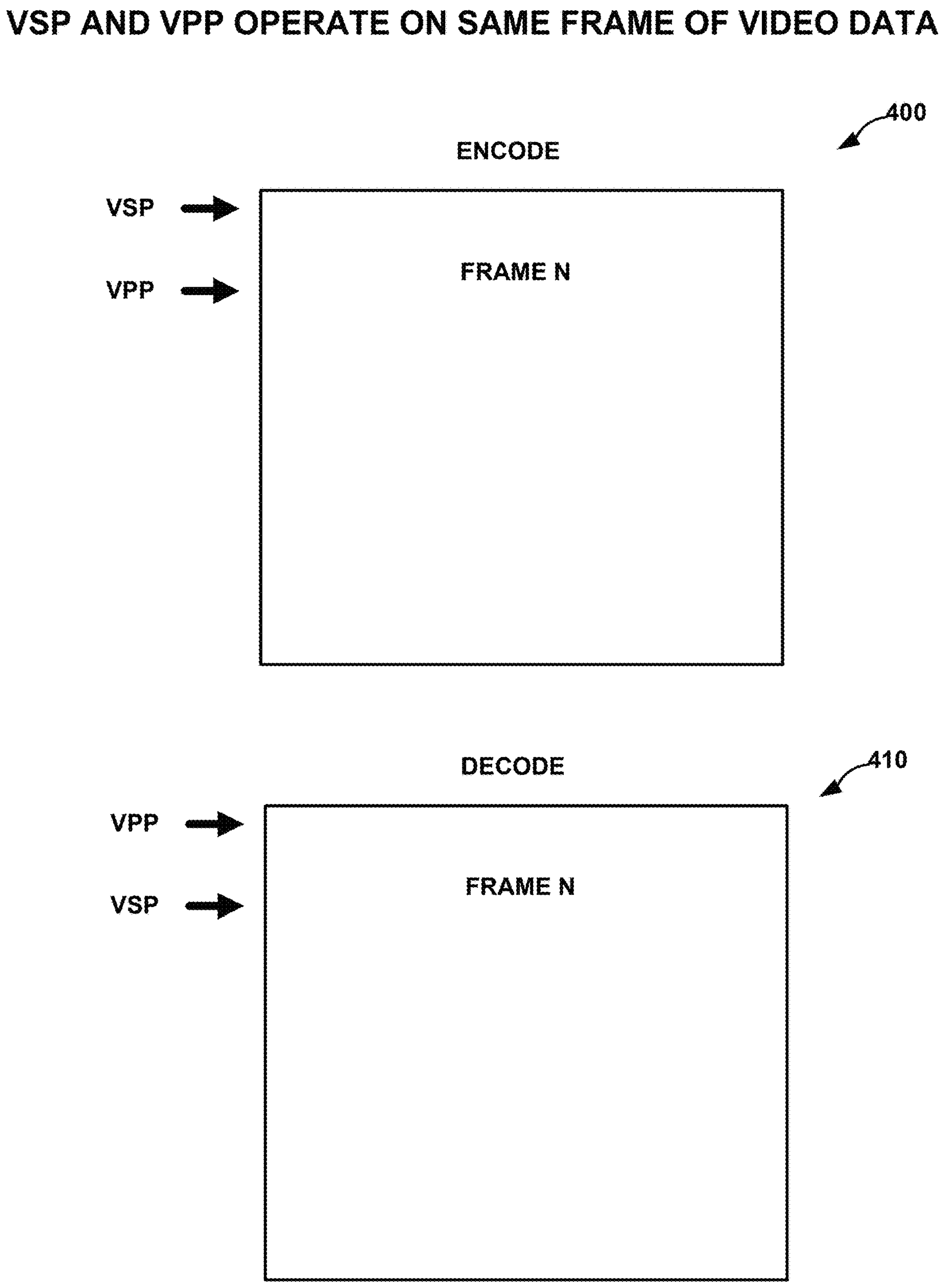
FIG. 4 illustrates example use cases of a VSP engine and a VPP engine operating on the same frame of video data.

FIG. 4 illustrates example use cases of a VSP engine and one or more VPP engines operating on the same frame of video data. In scenario 400, video encoder 200 uses a VSP engine and one or more VPP engines to process a Frame N of video data. Scenario 400 may be called a same frame mode of video encoding. In scenario 400, the one or more VPP engines and the VSP engine are configured to operate on the same frame of video data. That is, the one or more VPP engines start encoding Frame N and produces syntax elements (e.g., one or more LCU rows of syntax elements) that are stored in memory. After a certain amount of syntax elements are produced (e.g., one or more LCU rows of syntax element data), the VSP engine takes the syntax elements as input and produces the encoded video bitstream. Again, communication of data between the one or more VPP engines and the VSP engine may be though on-chip memory or external DDR memory. In some examples, scenario 400 may use on-chip memory, as the amount of data produced and consumed within a single frame is relatively small.

In scenario 410, video decoder 300 uses a VSP engine and a one or more VPP engines to process a Frame N of video data. Scenario 410 may be called a same frame mode of video decoding. In scenario 410, the one or more VPP engines and the VSP engine are configured to operate on the same frame of video data. That is, the VSP engine starts decoding Frame N and decodes syntax elements (e.g., one or more LCU rows of syntax elements) that are stored in memory. After a certain amount of syntax elements are decoded (e.g., one or more LCU rows of syntax element data), the one or more VPP engines take the syntax elements as input and produces decoded video data. Again, communication of data between the one or more VPP engines and the VSP engine may be though on-chip memory or external DDR memory. In some examples, scenario 400 may use on-chip memory, as the amount of data produced and consumed within a single frame is relatively small.

Scenario 400 and scenario 410 may be particularly useful for low latency video coding applications, where quicker changes in output provide for a better user experience. Such applications may include video conferencing, video telephony, AR applications, or XR applications that react to user interaction, such that immediate feedback is more beneficial.

Figure 5:
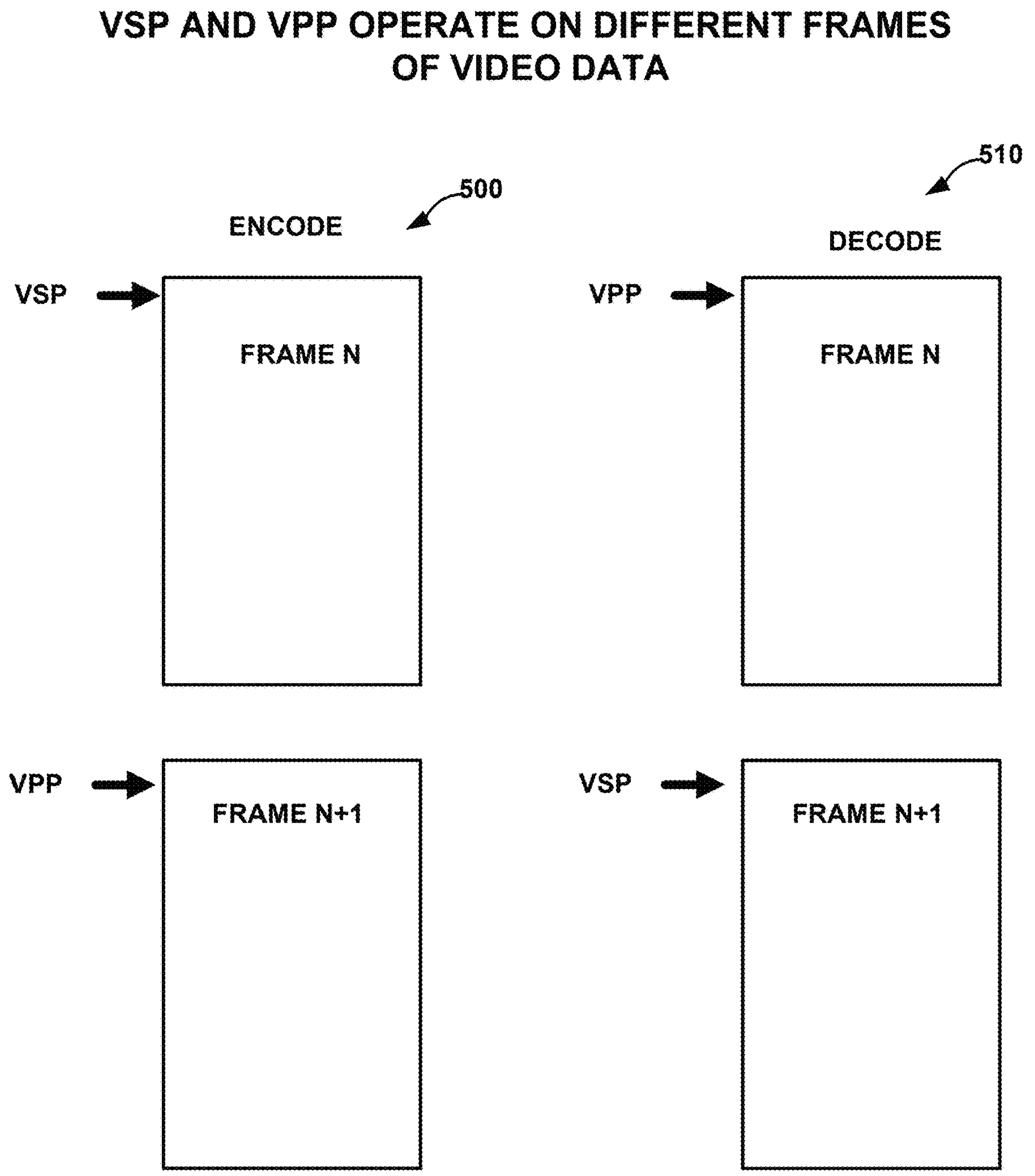
FIG. 5 illustrates example use cases of a VSP engine and a VPP engine operating on different frames of video data.

FIG. 5 illustrates example use cases of a VSP engine and a one or more VPP engines operating on different frames of video data. In scenario 500, video encoder 200 uses a VSP engine and a one or more VPP engines to encode a frame N of video data and a frame N+1 of video data substantially in parallel. That is, the VSP engine and the one or more VPP engines are configured to operate on different frames of video data in parallel. While scenario 500 shows the one or more VPP engines operating one frame ahead (e.g., at Frame N+1) of the VSP engine, in other examples, the one or more VPP engines may operate several frames ahead of the VSP engine. Scenario 500 may be called a different frame mode of video encoding.

In scenario 500, the one or more VPP engines completely encode (e.g., produces syntax elements) for the entirety of Frame N and then begins encoding Frame N+1. When the one or more VPP engines start encoding Frame N+1, the VSP engine begins consuming the syntax elements for Frame N produced by the one or more VPP engines and produces an encoded video bitstream for Frame N. Again, communication of data between the one or more VPP engines and the VSP engine may be though on-chip memory or external DDR memory. In some examples, scenario 500 may use DDR memory, as the amount of data produced and consumed for one or more entire frames of video data may be relatively large.

In scenario 510, video decoder 300 uses a VSP engine and a one or more VPP engines to decode a frame N of video data and a frame N+1 of video data substantially in parallel. That is, the VSP engine and the one or more VPP engines are configured to operate of different frames of video data in parallel. While scenario 510 shows the VSP engine operating one frame ahead (e.g., at Frame N+1) of the one or more VPP engines, in other examples, the VSP engine may operate several frames ahead of the one or more VPP engines. Scenario 510 may be called a different frame mode of video decoding.

In scenario 510, the VSP engine completely decodes (e.g., produces syntax elements) for the entirety of Frame N and then begins decoding Frame N+1. When the VSP engine starts decoding Frame N+1, the one or more VPP engines begin consuming the syntax elements for Frame N produced by the VSP engine and produces decoded video data for Frame N. Again, communication of data between the VPP engine and the one or more VPP engines may be though on-chip memory or external DDR memory. In some examples, scenario 510 may use DDR memory, as the amount of data produced and consumed for one or more entire frames of video data may be relatively large.

Scenario 500 and scenario 510 may be particular useful for video applications where low latency is not as beneficial, but consistent frame rates are desired. Such applications may include normal video playback, or AR or XR applications where the video is displayed very close to a user's eyes, such that changes in frame rate become more noticeable.

In general, video encoder 200 and video decoder 300 may include a VSP engine configured to process the video data at a syntax element level, one or more VPP engines configured to process the video data at a pixel level, and a controller. The controller is configured to control a power and a clock speed of the one or more VPP engines based on a bitrate of a video coding session. Specific examples of how the controller may power on and off the VSP engine in the scenarios of FIGS. 4 and 5 are described in more detail below.

Figure 6:
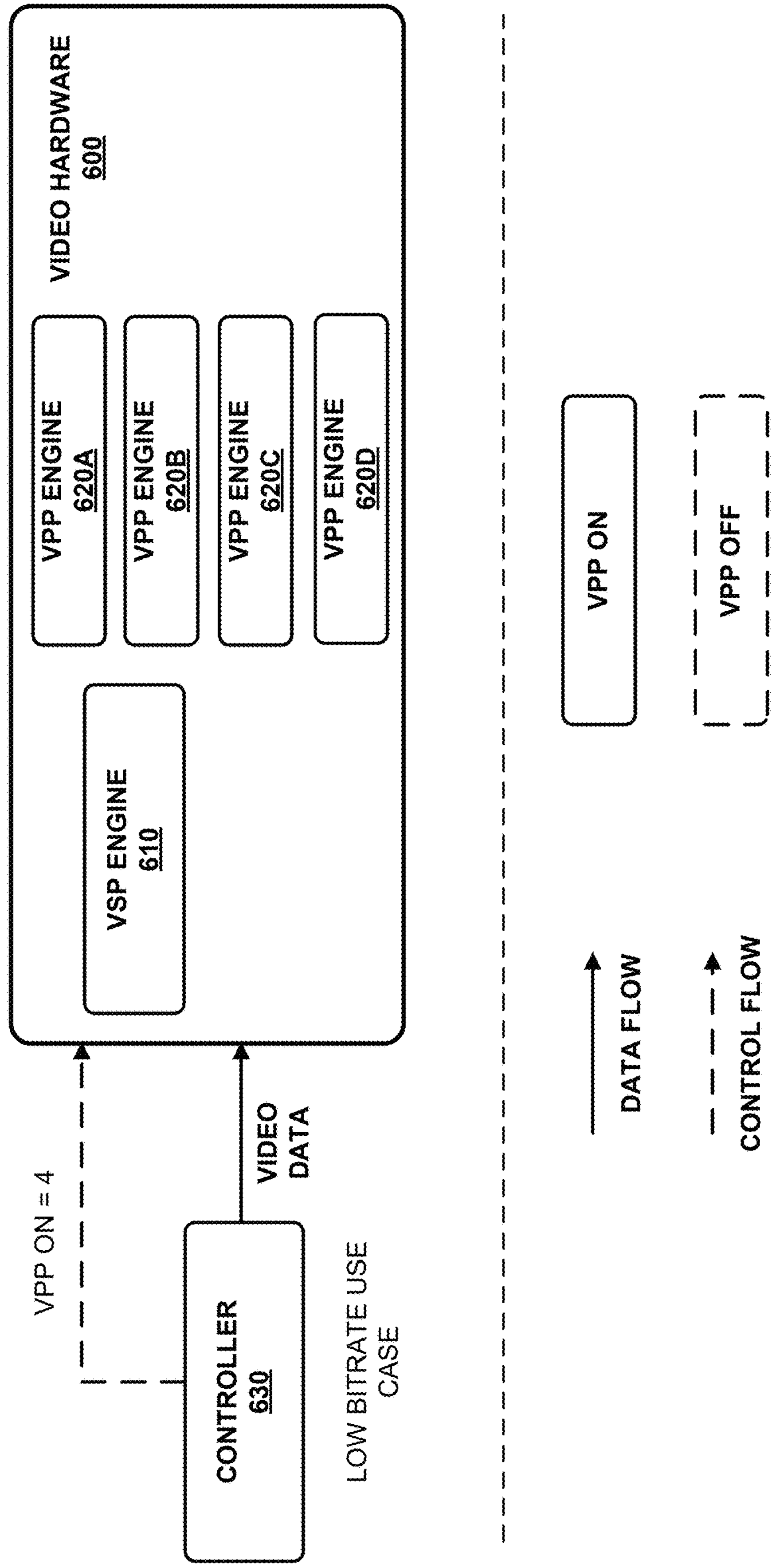
FIG. 6 is a block diagram illustrating one example of video hardware with a VSP engine and parallel VPP engines controlled by a controller for a low bitrate use case.

FIG. 6 is a block diagram illustrating one example of video hardware 600 with a VSP engine 610 and VPP engines 620A-D controlled by a controller 630 for a low bitrate use case. VPP engines 620A-D may operate substantially in parallel with each other. Video hardware 600 is generic to both a video encoder and a video decoder. That is, the order in which VSP engine 610 and parallel VPP engines 620A-D process video data may be switched based on whether video hardware 600 is configured as a video encoder (e.g., see FIG. 2), or a video decoder (e.g., see FIG. 3).

In the example of FIG. 6, the bitrate of the video coding session may be relatively low, such that the processing speed of VSP engine 610 may be matched by the processing speed of four VPP engines (e.g., VPP engine 620A, VPP engine 620B, VPP engine 620C, and VPP engine 620D). Example low bitrate use cases may include video streaming, surveillance, or video playback on power limited devices.

As described above, VSP engine 610 processes video data at a syntax element level, handling tasks such as entropy coding. VPP engines 620A, 620B, 620C, and 620D process video data at a pixel level, performing operations like prediction, transformation, and filtering. In the configuration of FIG. 6, all four VPP engines are active, as determined by controller 630, so as to match the processing speed of VSP engine 610.

Controller 630 plays a role in managing the operation of video hardware 600, particularly in scenarios involving varying bitrates. Controller 630 interfaces with the VSP engine 610 and the VPP engines 620A, 620B, 620C, and 620D, dynamically adjusting their power states and clock speeds based on the assessed bitrate of the video coding session. Controller 630 may determine the bitrate for the video coding session at a variety of granularities. For example, controller 630 may determine the bitrate for the entire an entire video sequence of the video coding session, may determine the bitrate for a subset of frames, or may determine the bitrate for each individual frame. This dynamic control ensures that the processing capabilities of the VPP engines align with the throughput requirements of the VSP engine, optimizing resource utilization and maintaining processing efficiency.

Upon receiving video data, controller 630 evaluates the bitrate to determine the number of active VPP engines 620A-D that matches the throughput of VSP engine 610. In low bitrate scenarios, controller 630 may activate all four VPP engines 620A-D (as shown in FIG. 6) to match the processing speed of the VSP engine 610. Conversely, in high bitrate scenarios, controller 630 may deactivate some of VPP engines 620A-D (see FIG. 7), reducing power consumption while ensuring that the remaining active VPP engines meet the processing demands. This selective activation and deactivation of VPP engines 620A-D allows for efficient power management, particularly in high-bitrate scenarios where VSP engine 610 may become a bottleneck.

The data flow and control flow within the video hardware 600 are orchestrated by controller 630, which may continuously or periodically monitor the bitrate and adjust the power states of VPP engines 620A-D accordingly. This real-time management of resources better ensures that video hardware 600 operates efficiently, conserving power while maintaining the necessary processing speed for the video coding session.

Figure 7:
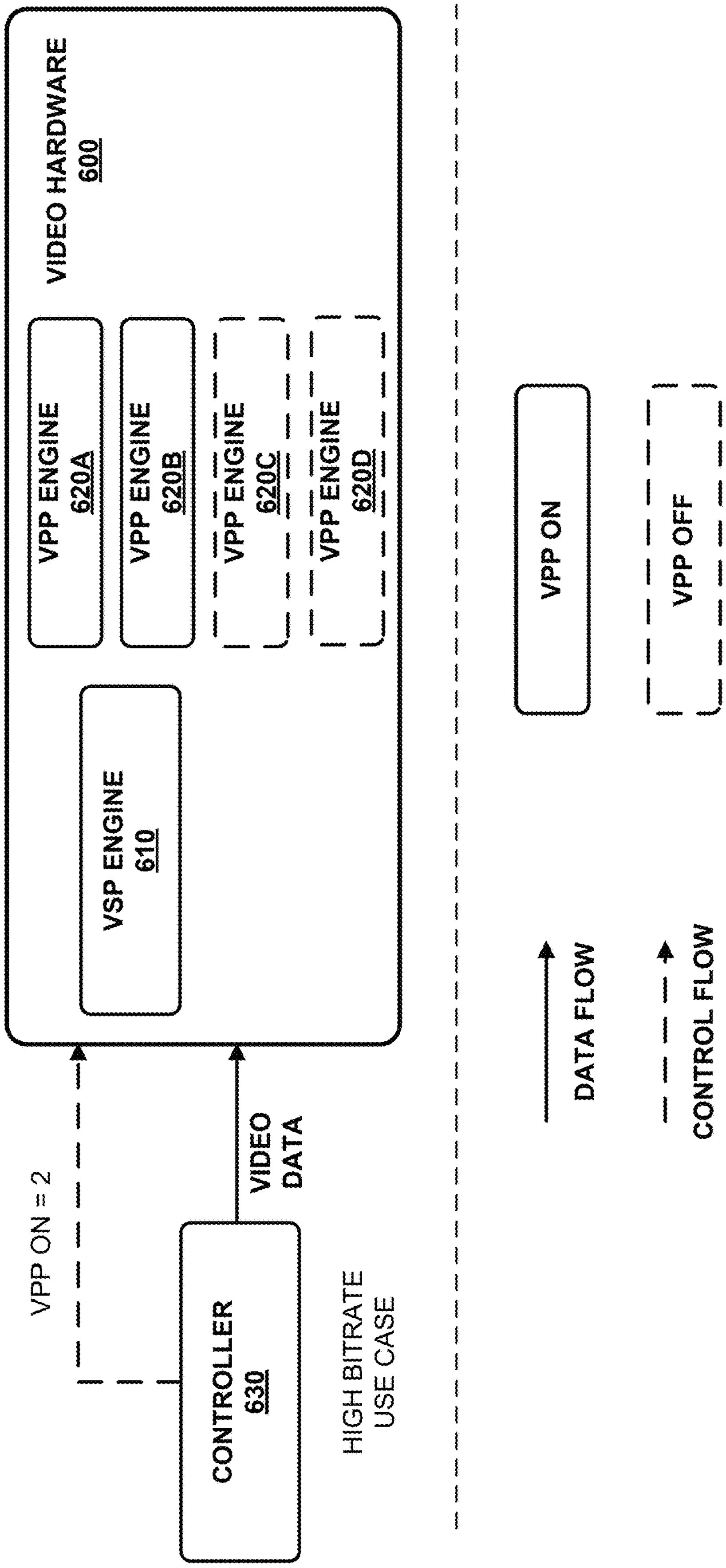
FIG. 7 is a block diagram illustrating one example of video hardware with a VSP engine and parallel VPP engines controlled by a controller for a high bitrate use case.

FIG. 7 is a block diagram illustrating one example of video hardware 600 with VSP engine 610 and parallel VPP 620A-D engines controlled by controller 630 for a high bitrate use case. High bitrate use cases often involve scenarios where video quality and low latency are important. These include applications such as extended reality (XR), which encompasses virtual reality (VR), mixed reality (MR), and augmented reality (AR). In these applications, multiple video streams may be processed simultaneously, such as separate streams for left and right eyes, alpha channels, and depth buffers. The requirement for real-time rendering and encoding with high quality results in low compression ratios and high bitrates, necessitating efficient management of video processing resources.

Another example of high bitrate use cases is video conferencing, where maintaining high video quality and low latency may be important for effective communication. This involves encoding and decoding video streams in real-time, often with multiple participants, which increases the demand on video processing hardware. The ability to dynamically adjust the number of active VPP engines based on the bitrate ensures that the system can handle the high data throughput without unnecessary power consumption.

Additionally, high-definition video streaming, such as 4K or 8K video content, represents a high bitrate use case. These applications may use significant processing power to encode and decode large amounts of data efficiently. By optimizing the power and clock speed of VPP engines in response to the bitrate, video hardware 600 can maintain the necessary processing speed while conserving energy, making the system suitable for mobile and battery-powered devices.

In this example, controller 630 receives video data and assesses the bitrate to determine the number of active VPP engines 620A-D. For this high bitrate use case, the controller 630 activates two VPP engines (e.g., VPP engine 620A and VP engine 620B) to ensure that the pixel processing speed aligns with the syntax processing speed of the VSP engine 610. This dynamic adjustment of the power state of the VPP engines based on the assessed bitrate ensures efficient power consumption while maintaining the required processing speed for the video coding session.

An example process that may be performed controller 630 to determine a number of VPP engines to power on and off is described below. This example includes four VPP engines and one VSP engine. In this example, the VSP engine is roughly four times faster than a single VPP engine. However, any ratio of processing speeds between the VSP engine and the VPP engine may be used with the techniques of this disclosure. Also, the techniques of this disclosure are usable with any number of VPP engines.

As described above, the processing speed of VSP engine 610 may be measured in megabits per second (e.g., X-Mbps) and the processing speed of a single VPP engine 620 may be measured in megapixels per second (e.g., Y-MPps). When controller 630 receives a frame of video data to encode or decode at a target bitrate, controller 630 may derive the frame size in terms of bits (M bits) and pixels (N pixels). Given the frame size, controller 630 may determine the estimated completion time (VSPt) of VSP engine 610 as a function of (M)/(X) for this frame. Additionally, given the frame size (e.g., resolution), controller 630 may determine the estimated completion time (VPPt) of a single VPP engine 620 as (N)/(Y) for this frame.

Note that the determination of a completion time of a VSP engine by controller 630 (or any controller of the this disclosure) may include additional parameters and heuristics, and is not necessarily a simple division of number of bits by the processing speed of the VPP. In general, controller 630 may determine the completion time as a function of (M)/(X). However, additional considerations including frame type (e.g., I-frame, P-frame, B-frame), scene complexity, and other parameters may affect the completion time. In addition, controller 630 in the context of a video decoder may not perform the same calculation as a video encoder, as the video decoder may receive information in the encoded bitstream that indicates specifically how many bits are present.

Controller 630 may then determine the number of VPP engines to match the VSP processing speed by comparing the completion time of the VSP (VSPt) to the completion time of a number of VPP engines (e.g., based on VPPt). In general, controller 630 may determine, based on the VPPt, a minimum number of the plurality VPP engines 620A-D that results in a total competition time that is greater than or equal to the VSPt. A specific example of four VPP engines is shown below.

If VSPt<VPPt/3 (engines), this means VSP engine 610 is fast enough to encode/decode the bits and service and/or drive four VPP engines 620A-D with full speed. In this case, NO VPP engine is powered off. This scenario may normally happen for low bitrate or target bitrate video coding sessions.

If VSPt>=VPPt/3 (engines) and VSPt<VPPt/2 (engines), this mean VSP 610 can only service and/or drive three of VPP engines 620A-D with full speed. In this case, controller 630 may turn off one of VPP engines 620A-D (e.g., VPP engine 620D is turned off).

If VSPt>=VPPt/2 (engines) and VSPt<VPPt/1 (engines), this mean VSP 610 can only service and/or drive two of VPP engines 620A-D with full speed. In this case, controller 630 may turn off two of VPP engines 620A-D (e.g., VPP engine 620C and VPP engine 620D are turned off). This situation may occur for a bitstream with medium or high bitrate If VSPt>=VPPt/1 (engines), this mean VSP 610 can only service and/or drive one of VPP engines 620A-D with full speed. In this case, controller 630 may turn off three of VPP engines 620A-D (e.g., VPP engine 620B, VPP engine 620C, and VPP engine 620D are turned off). This situation may occur for a bitstream with a very high bitrate.

Figure 8:
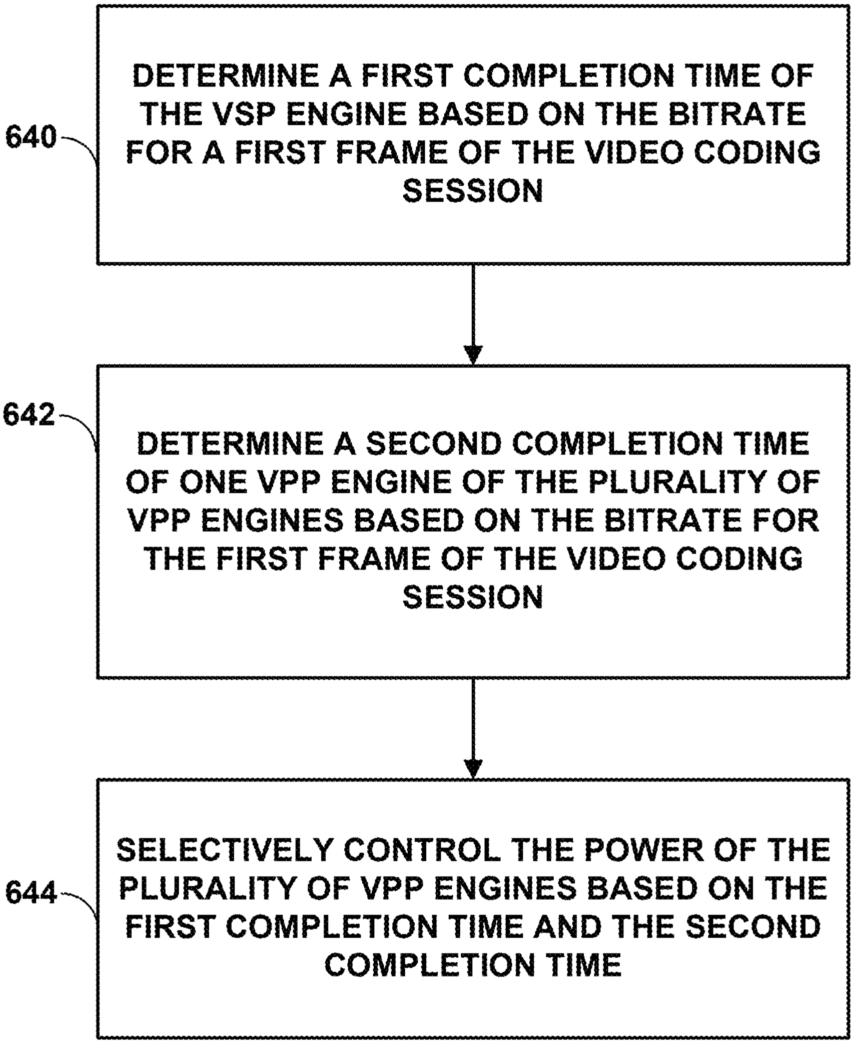
FIG. 8 is a flowchart illustrating one example for controlling power of one or more VPP engines based on bitrate.

FIG. 8 is a flowchart illustrating one example for controlling power of one or more VPP engines based on bitrate. The techniques of FIG. 8 may be performed by any controller described in this disclosure including controller 630 of FIGS. 6 and 7.

Controller 630 may be configured to determine a first completion time of a VSP engine based on the bits per frame for a frame of the video coding session (640), and determine a second completion time of one VPP engine of the plurality of VPP engines based on the bit per frame and resolution for the frame of the video coding session (642). This process may be repeated for each frame of the video coding session.

In one example, to determine the first completion time of the VSP engine, controller 630 may determine a number of bits for the frame of the video coding session based on the bitrate, and determine the first completion time of the VSP engine based on the number of bits and a first processing speed of the VSP engine. Likewise, to determine the second completion time of one VPP engine, controller 630 may determine a number of pixels for the frame of the video coding session based on the resolution of the frame, and determine the second completion time of the one VPP engine based on the number of pixels and a second processing speed of the one VPP engine.

Controller 630 may then selectively control the power of the plurality of VPP engines based on the first completion time and the second completion time (644). For example, to selectively control the power of one or more of the plurality of VPP engines, the controller is configured to determine, based on the second completion time of one VPP engine, a minimum number of the plurality VPP engines that results in a total competition time that is greater than or equal to the first completion time of the VSP engine, and selectively power on the minimum number of the plurality of VPP engines for the frame of the video coding session.

Figure 9:
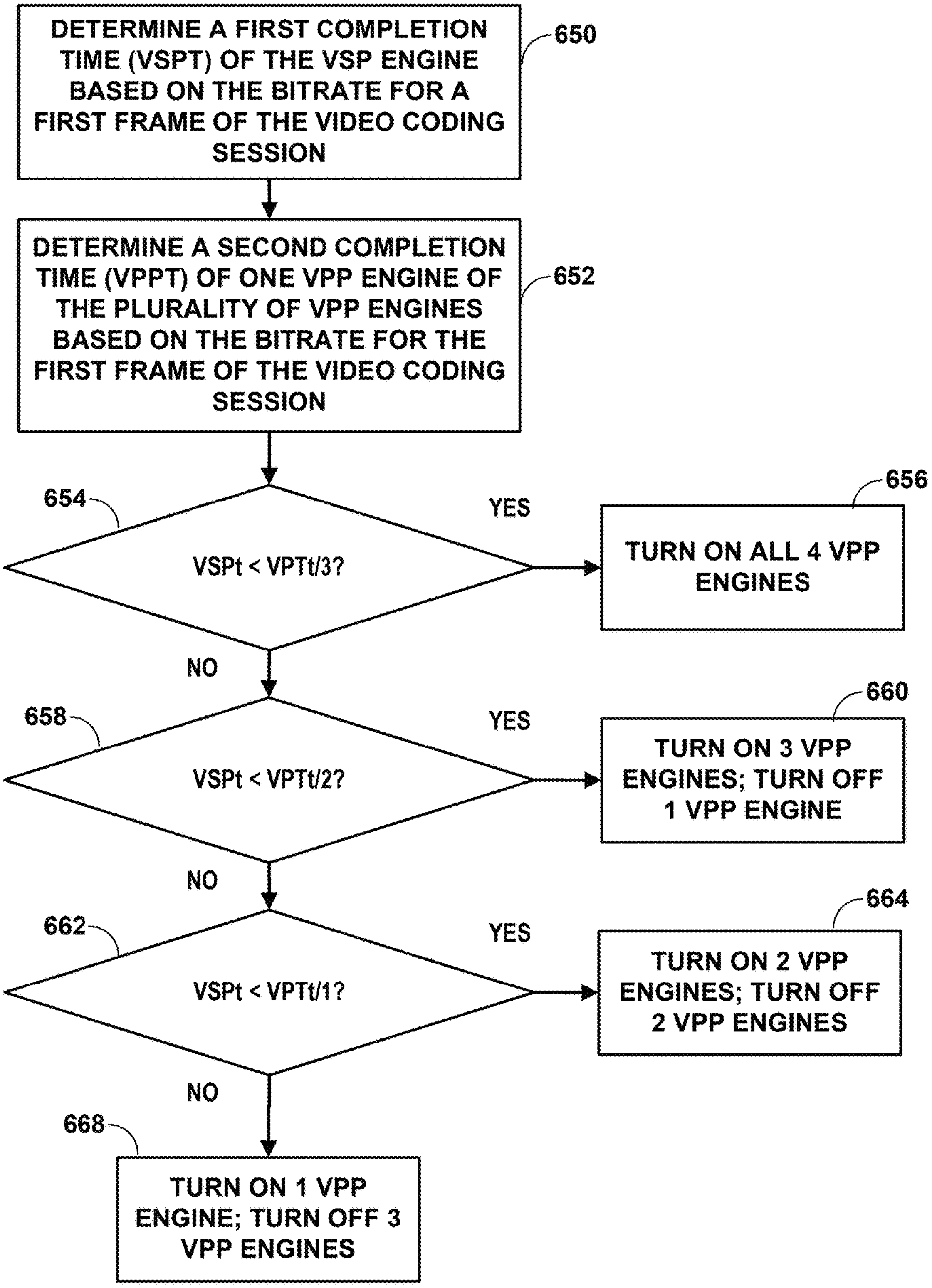
FIG. 9 is a flowchart illustrating another example for controlling power of one or more VPP engines based on bitrate.

FIG. 9 is a flowchart illustrating another example for controlling power of one or more VPP engines based on bitrate. The techniques of FIG. 9 may be performed by any controller described in this disclosure including controller 630 of FIGS. 6 and 7.

Controller 630 may determine a first completion time (VSPt) of a VSP engine based on the bitrate for a frame of a video coding session (650). Controller 630 may calculate this time to assess the processing capability of the VSP engine.

Next, controller 630 may determine a second completion time (VPPt) of one VPP engine of a plurality of VPP engines based on a resolution of the frame and the bitrate for the frame of the video coding session (652). Controller 630 may calculate the time needed for a single VPP engine to process the frame, considering the same bitrate.

Controller 630 then evaluates whether VSPt is less than VPPt divided by three (654). If this condition is met, controller 630 turns on all four VPP engines (656), ensuring that the processing speed of the VPP engines matches the VSP engine.

If VSPt is greater than VPPt divided by three, controller 630 checks if VSPt is less than VPPt divided by two (658). If true, controller 630 turns on three VPP engines and turns off one VPP engine 660, optimizing power consumption while maintaining processing efficiency.

VSPt exceeding VPPt divided by two prompts controller 630 to assess whether VSPt is less than VPPt divided by one (662). If this condition holds, controller 630 turns on two VPP engines and turns off two VPP engines (664), further adjusting the power state to align with the processing demands.

If VSPt is greater than or equal to VPPt divided by one, controller 630 turns on one VPP engine and turns off three VPP engines 668. This step ensures that the necessary number of VPP engines are active, conserving power while meeting the processing requirements of the video coding session.

Figure 10:
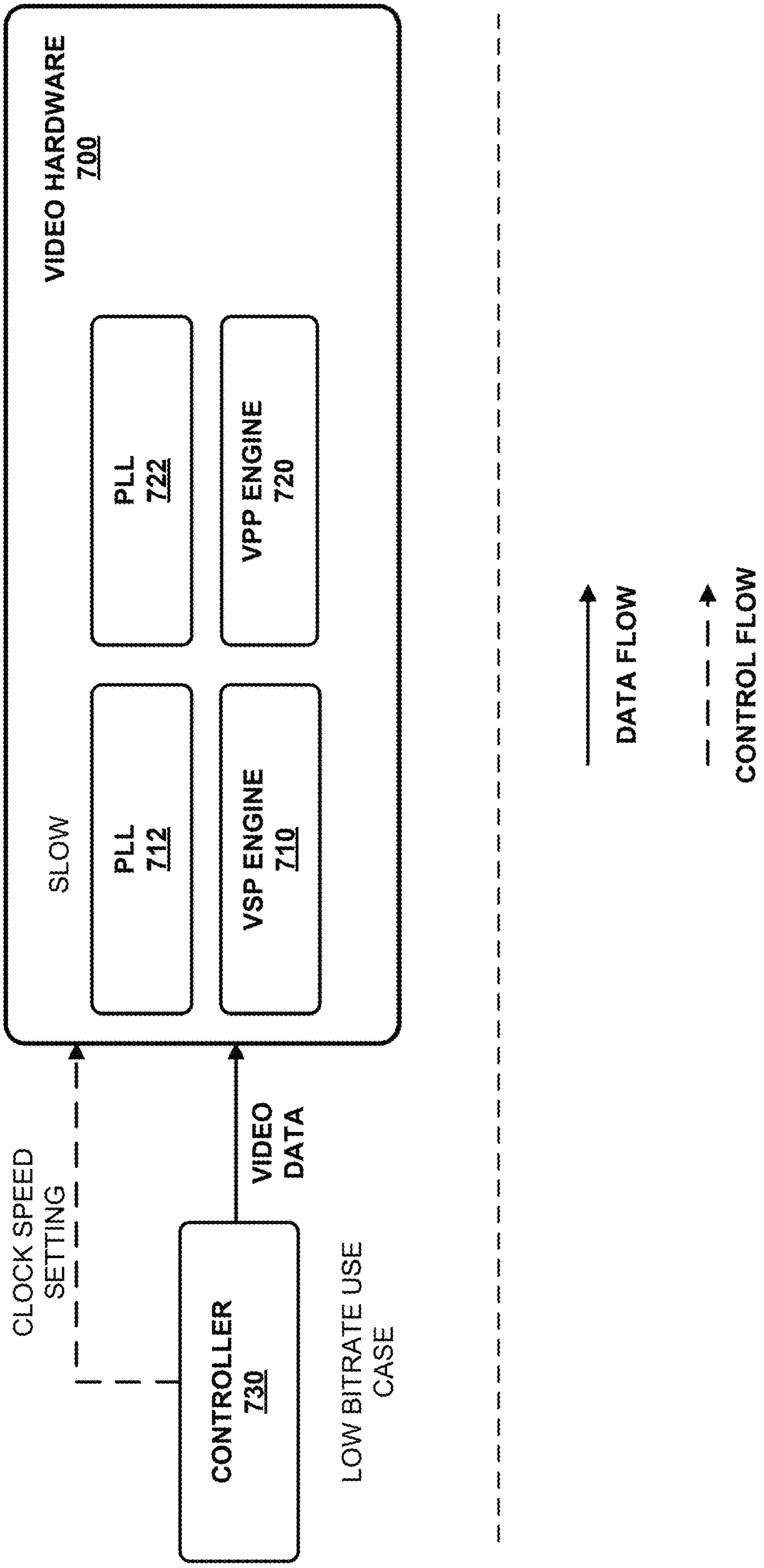
FIG. 10 is a block diagram illustrating one example of video hardware with a controller managing clock speed settings of a VSP engine and a single VPP engine for a low bitrate use case.

FIG. 10 is a block diagram illustrating one example of video hardware with a controller managing clock speed settings of a VSP engine and a single VPP engine for a low bitrate use case. In particular, FIG. 10 shows video hardware 700 configured for a low bitrate use case. The video hardware 700 includes VSP engine 710, VPP engine 720, phase locked loop (PLL) 712, and PLL 722. Controller 730 is configured to manage the clock speed settings of VSP engine 710 and/or the VPP engine 720 based on the bitrate of the video coding session. Video hardware 700 is generic to both a video encoder and a video decoder. That is, the order in which VSP engine 710 and VPP engine 720 process video data may be switched based on whether video hardware 700 is configured as a video encoder (e.g., see FIG. 2), or a video decoder (e.g., see FIG. 3).

Like the examples described above, VSP engine 710 processes video data at a syntax element level. VPP engine 720 processes video data at a pixel level. Controller 730 receives video data and assesses the bitrate to determine the necessary clock speed adjustments for the VSP engine 710 and/or VPP engine 720. In this low bitrate scenario, the controller 730 slows the clock speed of the VSP engine 710 to align with the processing requirements, optimizing power consumption while maintaining processing efficiency. PLL 712 and PLL 722 provide the necessary clock signals to the VSP engine 710 and the VPP engine 720, respectively.

A PLL is an electronic circuit that synchronizes an output signal's phase and frequency with a reference signal. It is widely used in communication systems, signal processing, and clock generation for processors. A PLL may be configured to continuously adjusts the output frequency to match the phase of the input reference signal, ensuring stable and precise frequency control. In the context of delivering clock speed to VSP engine 710 and/or VPP engine 720, PLL 712 and PLL 712 may use a stable reference clock as input and may generate a higher frequency clock signal. This output clock is used to drive the processor, allowing it to operate at the desired speed. The PLL can dynamically adjust the clock frequency, both higher and lower, to meet the processing demands, optimizing performance and power consumption. By using a PLL, systems can achieve flexible and efficient clock management, enabling processors to adapt to varying workloads. This capability is particularly beneficial in applications requiring dynamic frequency scaling, where the processor's clock speed is adjusted in real-time to balance performance and energy efficiency.

The data flow and control flow are indicated, showing the interaction between the controller 730 and the video hardware 700. Controller 730 dynamically adjusts the clock speed settings based on the assessed bitrate, ensuring efficient power consumption while maintaining the required processing speed for the video coding session.

Figure 11:
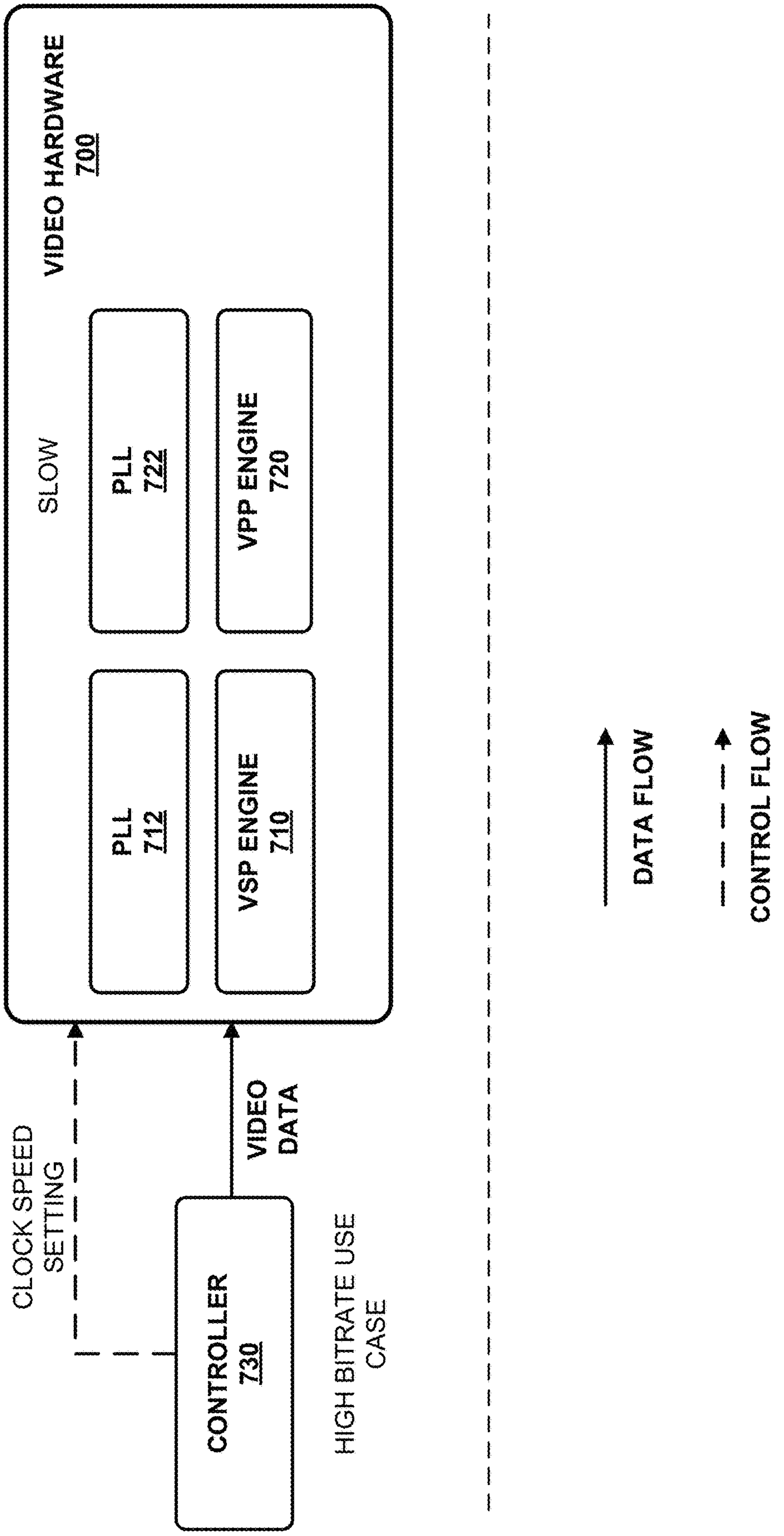
FIG. 11 is a block diagram illustrating one example of video hardware with a controller managing clock speed settings of a VSP engine and a single VPP engine for a high bitrate use case.

FIG. 11 is a block diagram illustrating one example of video hardware with a controller managing clock speed settings of a VSP engine and a single VPP engine for a high bitrate use case. More specifically, FIG. 11 shows video hardware 700 configured for a high bitrate use case. In this high bitrate scenario, the controller 730 slows the clock speed of the VPP Engine 720 to align with the processing requirements of VSP engine 710, optimizing power consumption while maintaining processing efficiency. PLL 712 and PLL 722 provide the clock signals to VSP engine 710 and the VPP engine 720, respectively.

An example process for adjusting a clock speed of one or more of VSP engine or VPP engine 720 is described below. As shown in FIG. 11, video hardware 700 has independently controllable PLLs (e.g., PLL 712 and PLL 722). As such, controller 730 can control VSP engine 710 and VPP engine 720 to have different speed or clock cycles. Like above, VSP engine processing speed is measured as X-Mbps and VPP engine processing speed is measured as Y-MPps.

When controller 730 receives a frame to encode with a target bitrate, controller 730 may derive the frame size in terms of bits and pixels (M bits N pixels). Controller 730 may determine the estimated VSP engine completion time (VSPt) for the frame as a function (M)/(X). Controller 730 may determine the estimated VPP engine completion time (VPPt) for the frame as (N)/(Y). The ratio of these two processing speeds is: Ratio=VSPt/VPPt.

For a low bitrate use case, VSP engine 710 is much faster than VPP engine 720. As such, controller 730 may program the clock speed setting of VSP engine 710 to be slower (e.g., a longer time of clock period). For example, controller 730 may set the clock speeds of VSP engine 710 and VPP engine 720 such that the VSP engine clock period=1/Ratio*VPP engine clock period.

For a high bitrate us case, VSP engine 710 is slower than VPP engine 720. As such, controller 730 may set the clock speed of VPP engine 720 to be slower (e.g., a longer time of clock period). For example, controller 730 may set the clock speeds of VSP engine 710 and VPP engine 720 such that the VPP engine clock period=Ratio*VSP engine clock period.

Figure 12:
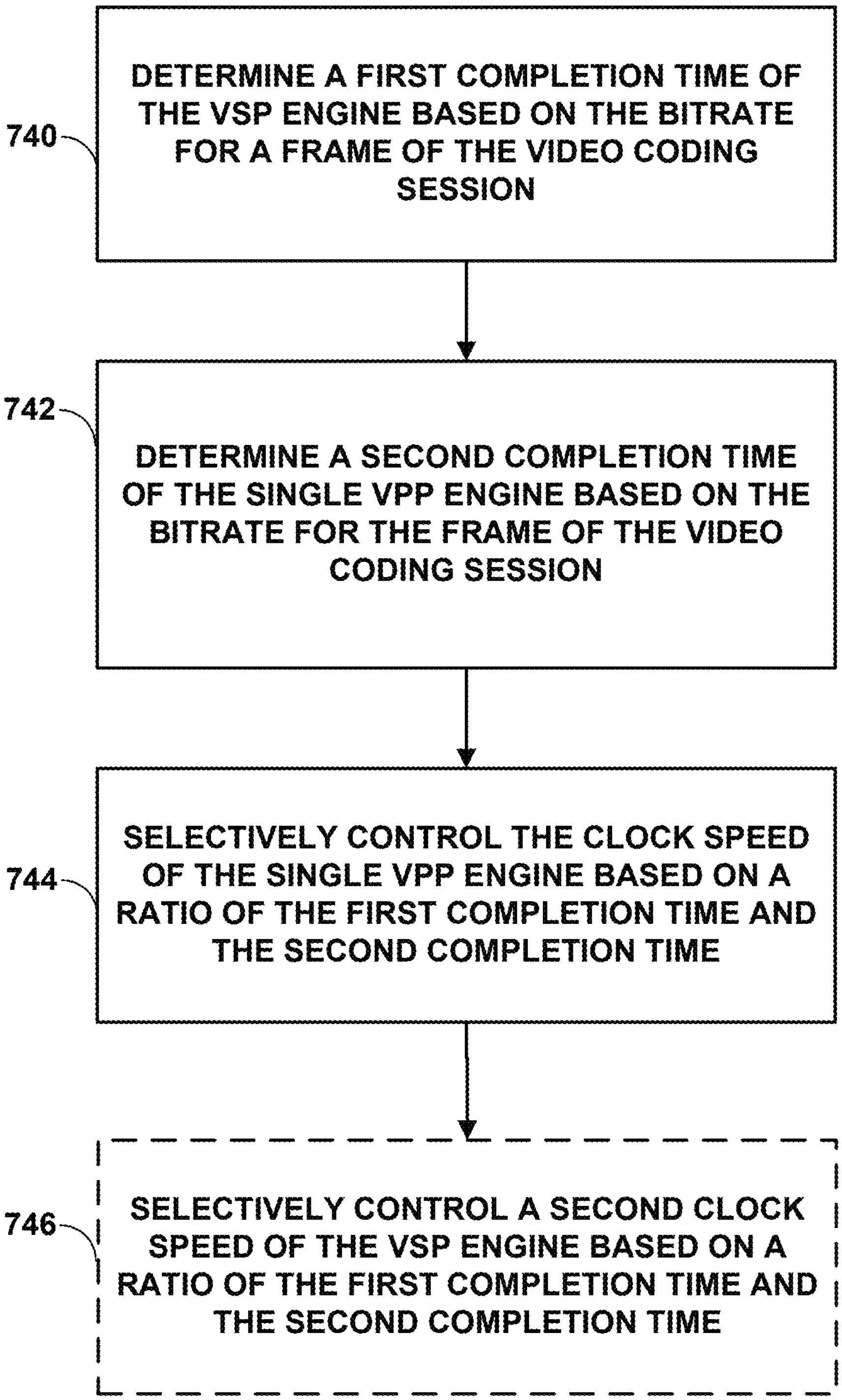
FIG. 12 is a flowchart illustrating one example of controlling clock speeds of a VSP engine and a VPP engine based on completion times derived from bitrate.

FIG. 12 is a flowchart illustrating one example of controlling clock speeds of a VSP engine and a VPP engine based on completion times derived from bitrate. The techniques of FIG. 12 may be performed by any controller described in this disclosure including controller 730 of FIGS. 10 and 11.

Controller 730 determines a first completion time of the VSP engine based on the bitrate for a frame of the video coding session (740). Determining the first completion time may include calculating the time required for VSP engine 710 to process the frame, considering the current bitrate. Controller 730 determines a second completion time of the single VPP engine 720 based on a resolution of the frame and the bitrate for the frame of the video coding session (742). Determining the second completion time may include determining the time needed for VPP engine 720 to process the frame, using the same resolution and bitrate.

Controller 730 may selectively control the clock speed of the single VPP engine 720 based on a ratio of the first completion time and the second completion time (744). This adjustment ensures that the processing speed of VPP engine 720 aligns with the processing speed of VSP engine 710, optimizing power consumption. Optionally, controller 730 may also selectively control a second clock speed of VSP engine 710 based on a ratio of the first completion time and the second completion time. This step further refines the synchronization between the VSP and VPP engines, enhancing processing efficiency.

Figure 13:
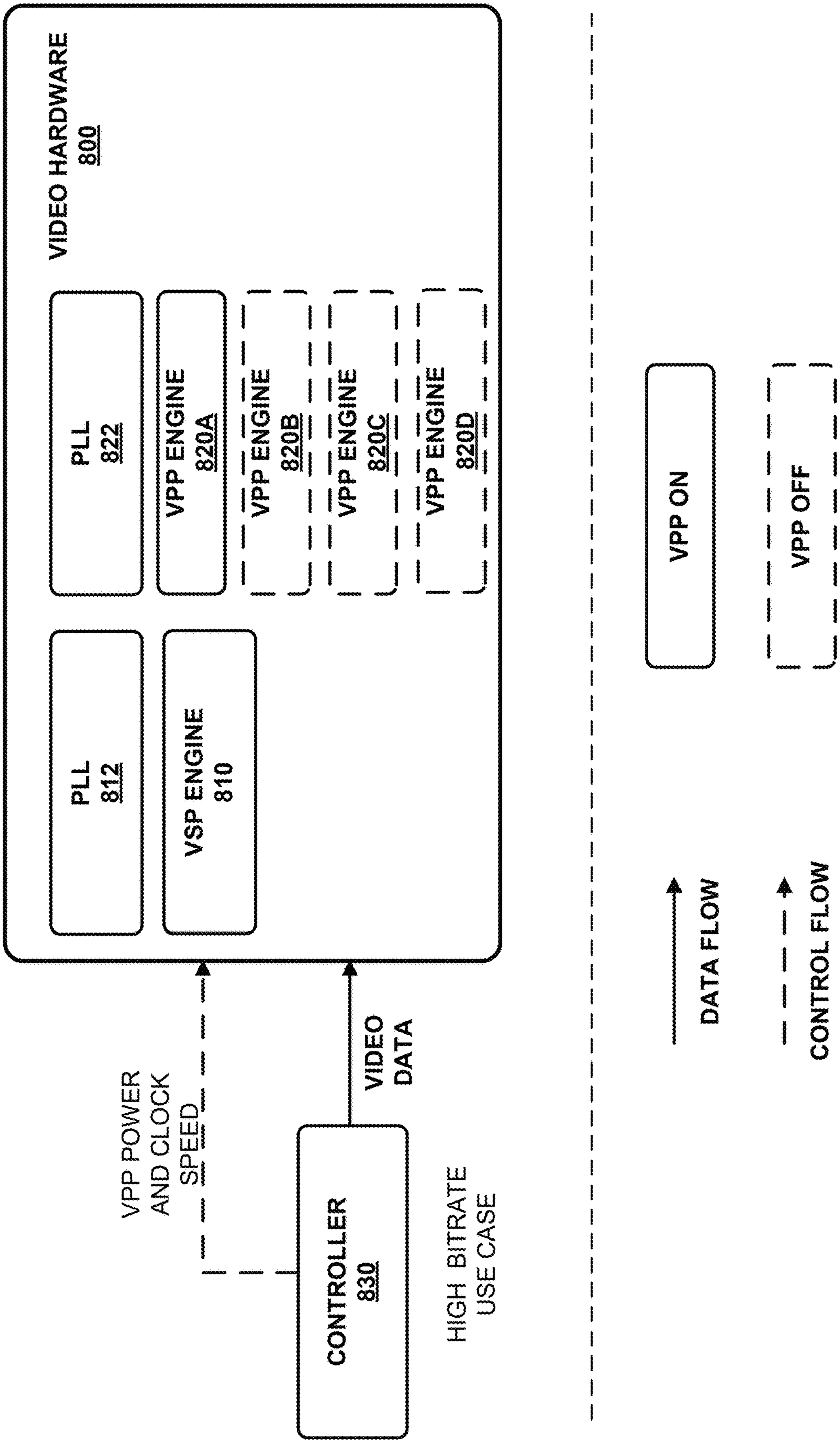
FIG. 13 is a block diagram illustrating one example of video hardware with a controller managing clock speed settings and power for a VSP engine and one or more VPP engines.

FIG. 13 is a block diagram illustrating one example of video hardware with a controller managing clock speed settings and power for a VSP engine and one or more VPP engines. More specifically, FIG. 13 shows video hardware 800, which integrates a VSP engine 810 and multiple VPP engines, including VPP engine 820A, VPP engine 820B, VPP engine 820C, and VPP engine 820D. Video hardware 800 utilizes PLL 812 and PLL 822 to manage clock speeds, with a controller 830 orchestrating the operations.

In this configuration, controller 830 manages the power and clock speed of the VPP engines based on the bitrate of the video stream. For a high bitrate stream, controller 830 may deactivate three VPP engines, leaving only VPP engine 820A powered on. This selective deactivation reduces power consumption by minimizing the number of active VPP engines.

Additionally, controller 830 adjusts the clock speed of VPP engine 820A using PLL 822. By slowing the clock speed, controller 830 may further align the pixel processing speed of VPP engine 820A with the processing speed of VSP engine 810 for situations where a single VPP engine is still faster than the VSP engine. This adjustment further optimizes power usage by reducing the dynamic power of VPP engine 820A. The configuration depicted in FIG. 13 combines elements from FIG. 7 and FIG. 11, illustrating a hybrid approach to managing video processing resources. The system effectively balances the processing capabilities of the VSP and VPP engines, ensuring efficient operation even under high bitrate conditions.

Similarly, for a very low bitrate stream use case, such as some scenes in XR, gaming, cartoon movies, the VSP engine speed may be extremely fast relative to VPP engine speed. In this scenario, controller 830 may be configured to lower the clock speed of VSP engine 810 to better match the processing speed of any number of active VPP engines. This may further reduce VSP engine dynamic power.

Figure 14:
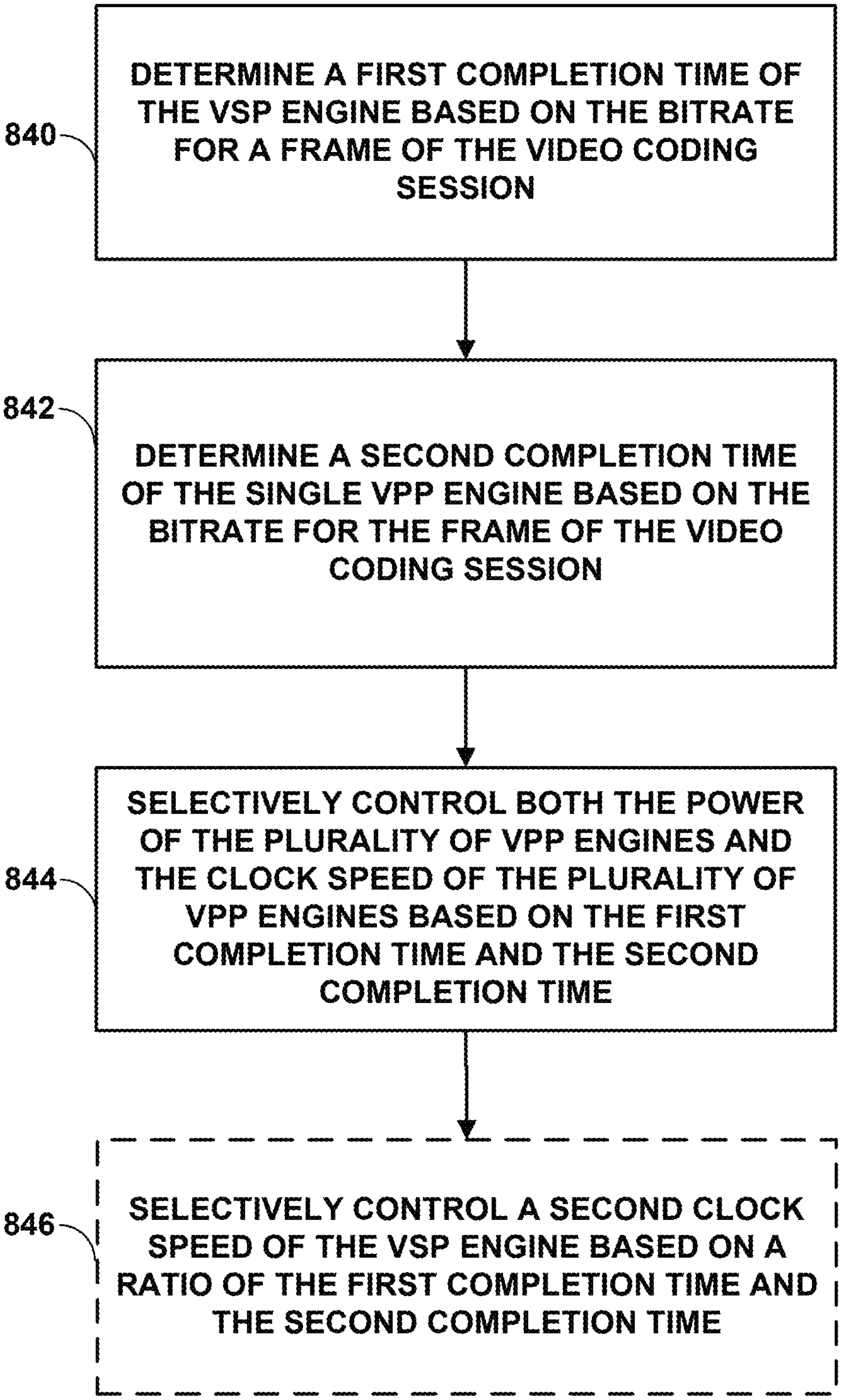
FIG. 14 is a flowchart illustrating one example of controlling power and clock speed of one or more VPP engines.

FIG. 14 is a flowchart illustrating one example of controlling power and clock speed of one or more VPP engines. The techniques of FIG. 14 may be performed by any controller described in this disclosure including controller 830 of FIG. 13.

Controller 830 may first determine a first completion time of VSP engine 810 based on the bitrate for a frame of the video coding session (840). For example, controller 830 may calculate how long VSP engine 810 will take to process the frame given the current bitrate.

Controller 830 may further determine a second completion time of a single VPP engine 820 based on a resolution for the frame and the bitrate for the frame of the video coding session (842). For example, controller 830 calculates the time required for VPP engine 820 to process the frame, considering the same bitrate.

Controller 830 may then selectively control both the power of the plurality of VPP engines 820 and the clock speed of the plurality of VPP engines 820 based on the first completion time and the second completion time (844). This adjustment ensures that the VPP engines' processing speed aligns with the VSP engine's speed, optimizing power consumption.

Optionally, controller 830 may further selectively controls a second clock speed of the VSP engine based on a ratio of the first completion time and the second completion time (846). This step further refines the synchronization between the VSP and VPP engines, enhancing processing efficiency.

Figure 15:
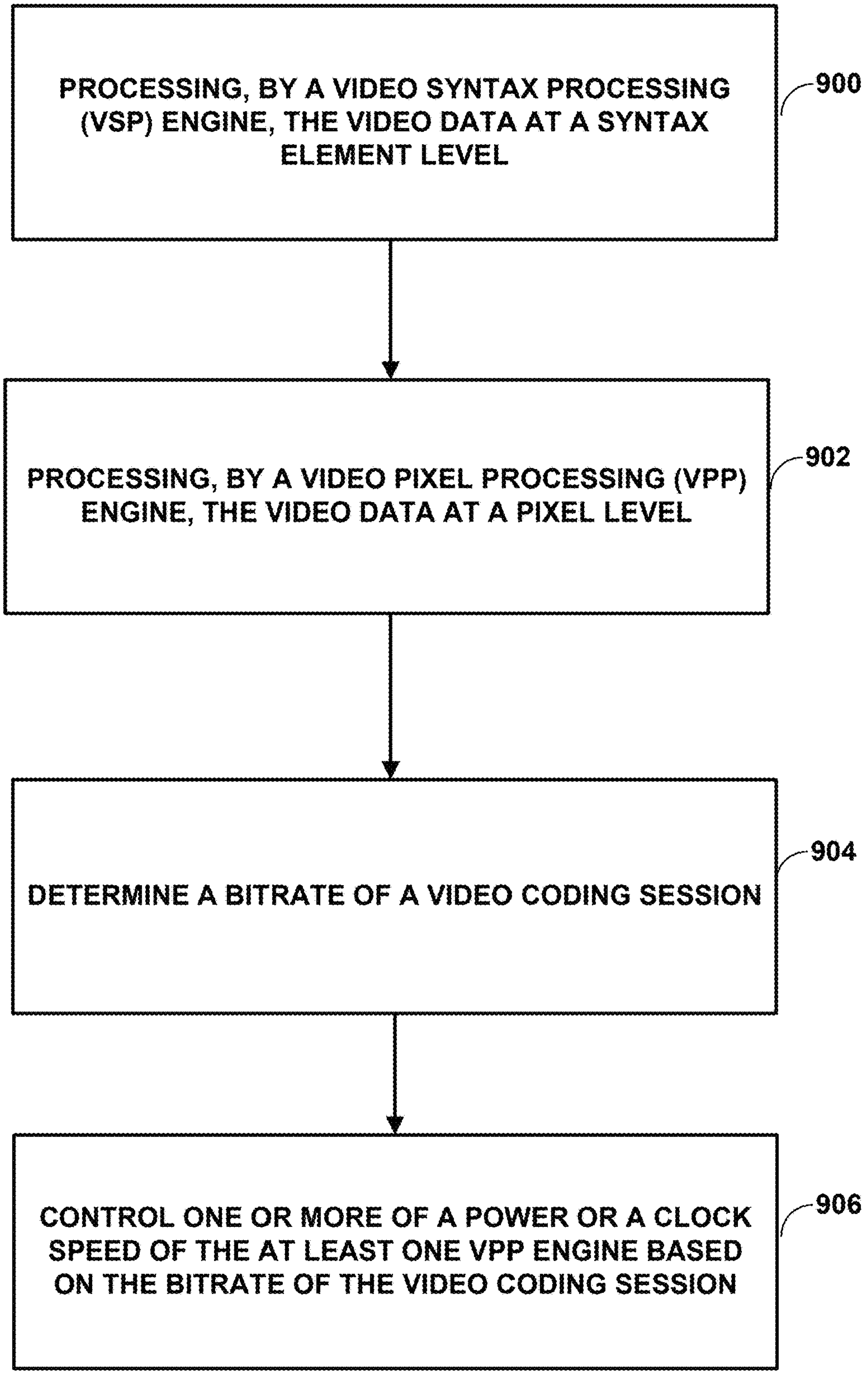
FIG. 15 is a flowchart illustrating one example of controlling power or clock speed of a VPP engine based on video coding session bitrate.

FIG. 15 is a flowchart illustrating one example of controlling power or clock speed of a VPP engine based on video coding session bitrate. The example of FIG. 15 may be performed by any controller of a video encoder or video decoder described in this disclosure.

In one example, video encoder 200 and/or video decoder 300 may be configured to process, by a video syntax processing (VSP) engine, video data at a syntax element level (900), as well as process, by a video pixel processing (VPP) engine, the video data at a pixel level (902). Video encoder 200 and/or video decoder 300 determine a bitrate of a video coding session (904), and control one or more of a power or a clock speed of the at least one VPP engine based on the bitrate of the video coding session using any combination of techniques described above (906).

Based on the bitrate of a video coding session, the techniques of this disclosure utilizes a controller to dynamically scale the number of active VPP engines, maintaining the decode and encode speeds while reducing the pipe utilization penalty caused by a slowed-down VSP engine. This approach significantly reduces dynamic and leakage power, especially beneficial for very high bitrate use cases like ultra high definition (UHD) video at 30 fps (frames per second) with 500 Mbps, where the VSP engine may be extremely slow. For example, the techniques of this disclosure may allow three out of four VPP engines (e.g., in one example configuration) to be shut off in a parallel architecture, reducing video processing power by approximately 75%. For regular use cases with target bitrates, low bitrates, or high bitrates, where frame size fluctuates around the average bitrate, the techniques of this disclosure can adaptively manage the VPP engines, potentially saving around 3% of dynamic power. In non-parallel architectures, programming a PLL for VPP with one-third of the PLL VSP frequency can reduce dynamic power by 60%, as power is proportional to clock speed. This solution effectively reduces video hardware power by activating only the necessary number of pixel processing pipes (e.g., VPPs), achieving up to 75% power reduction for a four-pipe architecture and 50% for a two-pipe architecture.

The following numbered clauses illustrate one or more aspects of the devices and techniques described in this disclosure.

Clause 1. An apparatus configured to code video data, the apparatus comprising: a video syntax processing (VSP) engine configured to process the video data at a syntax element level; at least one video pixel processing (VPP) engine configured to process the video data at a pixel level; and a controller configured to: determine a bitrate of a video coding session; and control one or more of a power or a clock speed of the at least one VPP engine based on the bitrate of the video coding session.

Clause 2. The apparatus of Clause 1, wherein the at least one VPP engine comprises a plurality of VPP engines, each VPP engine configured for independent power control, and wherein to control one or more of the power or the clock speed of the at least one VPP engine based on the bitrate of the video coding session, the controller is configured to: determine a first completion time of the VSP engine based on the bitrate for a frame of the video coding session; determine a second completion time of one VPP engine of the plurality of VPP engines based on a resolution for the frame and the bitrate for the frame of the video coding session; and selectively control the power of the plurality of VPP engines based on the first completion time and the second completion time.

Clause 3. The apparatus of Clause 2, wherein to determine the first completion time of the VSP engine, the controller is configured to: determine a number of bits for the frame of the video coding session based on the bitrate; and determine the first completion time of the VSP engine based on the number of bits and a first processing speed of the VSP engine, and wherein to determine the second completion time of one VPP engine, the controller is configured to: determine a number of pixels for the frame of the video coding session; and determine the second completion time of the one VPP engine based on the number of pixels and a second processing speed of the one VPP engine.

Clause 4. The apparatus of any of Clauses 2-3, wherein to selectively control the power of one or more of the plurality of VPP engines, the controller is configured to: determine, based on the second completion time of one VPP engine, a minimum number of the plurality VPP engines that results in a total completion time that is greater than or equal to the first completion time of the VSP engine; and selectively power on the minimum number of the plurality of VPP engines for the frame of the video coding session.

Clause 5. The apparatus of Clause 1, wherein the at least one VPP engine comprises a single VPP engine, wherein to control one or more of the power or the clock speed of the at least one VPP engine based on the bitrate of the video coding session, the controller is configured to: determine a first completion time of the VSP engine based on the bitrate for a frame of the video coding session; determine a second completion time of the single VPP engine based on a resolution for the frame and the bitrate for the frame of the video coding session; and selectively control the clock speed of the single VPP engine based on a ratio of the first completion time and the second completion time.

Clause 6. The apparatus of Clause 5, wherein the controller is further configured to: selectively control a second clock speed of the VSP engine based on a ratio of the first completion time and the second completion time.

Clause 7. The apparatus of Clause 1, wherein the at least one VPP engine comprises a plurality of VPP engines, each VPP engine configured for independent power control, and wherein to control one or more of the power or the clock speed of the at least one VPP engine based on the bitrate of the video coding session, the controller is configured to: determine a first completion time of the VSP engine based on the bitrate for a frame of the video coding session; determine a second completion time of one VPP engine of the plurality of VPP engines based on a resolution for the frame and the bitrate for the frame of the video coding session; and selectively control both the power of the plurality of VPP engines and the clock speed of the plurality of VPP engines based on the first completion time and the second completion time.

Clause 8. The apparatus of Clause 7, wherein the controller is further configured to: selectively control a second clock speed of the VSP engine based on the first completion time and the second completion time.

Clause 9. The apparatus of any of Clauses 1-8, wherein the VSP engine is configured to perform context adaptive binary arithmetic coding (CABAC) and operates at a first processing speed based on bits of the video data, and wherein the VPP engine is configured to perform one or more of transform processing, prediction, or filtering, and operates at a second processing speed based on pixels of the video data, wherein the second processing speed is slower than the first processing speed.

Clause 10. The apparatus of any of Clauses 1-9, wherein the apparatus is a mobile communications device or an extended reality (XR) device.

Clause 11. A method for coding video data, comprising: determining a bitrate of a video coding session; processing the video data at a syntax element level using a video syntax processing (VSP) engine at the bitrate; processing the video data at a pixel level using at least one video pixel processing (VPP) engine; and controlling one or more of a power or a clock speed of the at least one VPP engine based on the bitrate of the video coding session.

Clause 12. The method of Clause 11, wherein the at least one VPP engine comprises a plurality of VPP engines, each VPP engine configured for independent power control, and wherein controlling one or more of the power or the clock speed of the at least one VPP engine based on the bitrate of the video coding session comprises: determining a first completion time of the VSP engine based on the bitrate for a frame of the video coding session; determining a second completion time of one VPP engine of the plurality of VPP engines based on a resolution for the frame and the bitrate for the frame of the video coding session; and selectively controlling the power of the plurality of VPP engines based on the first completion time and the second completion time.

Clause 13. The method of Clause 12, wherein determining the first completion time of the VSP engine comprises: determining a number of bits for the frame of the video coding session based on the bitrate; and determining the first completion time of the VSP engine based on the number of bits and a first processing speed of the VSP engine, and wherein determining the second completion time of one VPP engine comprises: determining a number of pixels for the frame of the video coding session; and determining the second completion time of the one VPP engine based on the number of pixels and a second processing speed of the one VPP engine.

Clause 14. The method of any of Clauses 12-13, wherein selectively controlling the power of one or more of the plurality of VPP engines comprises: determining, based on the second completion time of one VPP engine, a minimum number of the plurality VPP engines that results in a total completion time that is greater than or equal to the first completion time of the VSP engine; and selectively powering on the minimum number of the plurality of VPP engines for the frame of the video coding session.

Clause 15. The method of Clause 11, wherein the at least one VPP engine comprises a single VPP engine, wherein controlling one or more of the power or the clock speed of the at least one VPP engine based on the bitrate of the video coding session comprises: determining a first completion time of the VSP engine based on the bitrate for a frame of the video coding session; determining a second completion time of the single VPP engine based on a resolution for the frame and the bitrate for the frame of the video coding session; and selectively controlling the clock speed of the single VPP engine based on a ratio of the first completion time and the second completion time.

Clause 16. The method of Clause 15, further comprising: selectively controlling a second clock speed of the VSP engine based on a ratio of the first completion time and the second completion time.

Clause 17. The method of Clause 11, wherein the at least one VPP engine comprises a plurality of VPP engines, each VPP engine configured for independent power control, and wherein controlling one or more of the power or the clock speed of the at least one VPP engine based on the bitrate of the video coding session comprises: determining a first completion time of the VSP engine based on the bitrate for a frame of the video coding session; determining a second completion time of one VPP engine of the plurality of VPP engines based on a resolution for the frame and the bitrate for the frame of the video coding session; and selectively controlling both the power of the plurality of VPP engines and the clock speed of the plurality of VPP engines based on the first completion time and the second completion time.

Clause 18. The method of Clause 17, further comprising: selectively controlling a second clock speed of the VSP engine based on the first completion time and the second completion time.

Clause 19. The method of any of Clauses 11-18, wherein the VSP engine is configured to perform context adaptive binary arithmetic coding (CABAC) and operates at a first processing speed based on bits of the video data, and wherein the VPP engine is configured to perform one or more of transform processing, prediction, or filtering, and operates at a second processing speed based on pixels of the video data, wherein the second processing speed is slower than the first processing speed.

Clause 20. The method of any of Clauses 11-19, wherein the method is performed by one or more processors of a mobile communications device or an extended reality (XR) device.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video data, the apparatus comprising:
- a video syntax processing (VSP) engine configured to process the video data at a syntax element level;
- at least one video pixel processing (VPP) engine configured to process the video data at a pixel level; and
- a controller configured to:
  - determine a bitrate of a video coding session; and
  - control one or more of a power or a clock speed of the at least one VPP engine based on the bitrate of the video coding session.

2. The apparatus of claim 1, wherein the at least one VPP engine comprises a plurality of VPP engines, each VPP engine configured for independent power control, and wherein to control one or more of the power or the clock speed of the at least one VPP engine based on the bitrate of the video coding session, the controller is configured to:
- determine a first completion time of the VSP engine based on the bitrate for a frame of the video coding session;
- determine a second completion time of one VPP engine of the plurality of VPP engines based on a resolution for the frame and the bitrate for the frame of the video coding session; and
- selectively control the power of the plurality of VPP engines based on the first completion time and the second completion time.

3. The apparatus of claim 2, wherein to determine the first completion time of the VSP engine, the controller is configured to:
- determine a number of bits for the frame of the video coding session based on the bitrate; and
- determine the first completion time of the VSP engine based on the number of bits and a first processing speed of the VSP engine, and
- wherein to determine the second completion time of one VPP engine, the controller is configured to:
- determine a number of pixels for the frame of the video coding session; and
- determine the second completion time of the one VPP engine based on the number of pixels and a second processing speed of the one VPP engine.

4. The apparatus of claim 2, wherein to selectively control the power of one or more of the plurality of VPP engines, the controller is configured to:
- determine, based on the second completion time of one VPP engine, a minimum number of the plurality VPP engines that results in a total completion time that is greater than or equal to the first completion time of the VSP engine; and
- selectively power on the minimum number of the plurality of VPP engines for the frame of the video coding session.

5. The apparatus of claim 1, wherein the at least one VPP engine comprises a single VPP engine, wherein to control one or more of the power or the clock speed of the at least one VPP engine based on the bitrate of the video coding session, the controller is configured to:

determine a first completion time of the VSP engine based on the bitrate for a frame of the video coding session;

determine a second completion time of the single VPP engine based on a resolution for the frame and the bitrate for the frame of the video coding session; and selectively control the clock speed of the single VPP engine based on a ratio of the first completion time and the second completion time.

6. The apparatus of claim 5, wherein the controller is further configured to:

selectively control a second clock speed of the VSP engine based on a ratio of the first completion time and the second completion time.

7. The apparatus of claim 1, wherein the at least one VPP engine comprises a plurality of VPP engines, each VPP engine configured for independent power control, and wherein to control one or more of the power or the clock speed of the at least one VPP engine based on the bitrate of the video coding session, the controller is configured to:

determine a first completion time of the VSP engine based on the bitrate for a frame of the video coding session;

determine a second completion time of one VPP engine of the plurality of VPP engines based on a resolution for the frame and the bitrate for the frame of the video coding session; and selectively control both the power of the plurality of VPP engines and the clock speed of the plurality of VPP engines based on the first completion time and the second completion time.

8. The apparatus of claim 7, wherein the controller is further configured to:

selectively control a second clock speed of the VSP engine based on the first completion time and the second completion time.

9. The apparatus of claim 1, wherein the VSP engine is configured to perform context adaptive binary arithmetic coding (CABAC) and operates at a first processing speed based on bits of the video data, and wherein the VPP engine is configured to perform one or more of transform processing, prediction, or filtering, and operates at a second processing speed based on pixels of the video data, wherein the second processing speed is slower than the first processing speed.

10. The apparatus of claim 1, wherein the apparatus is a mobile communications device or an extended reality (XR) device.

11. A method for coding video data, comprising:

determining a bitrate of a video coding session;

processing the video data at a syntax element level using a video syntax processing (VSP) engine at the bitrate;

processing the video data at a pixel level using at least one video pixel processing (VPP) engine; and controlling one or more of a power or a clock speed of the at least one VPP engine based on the bitrate of the video coding session.

12. The method of claim 11, wherein the at least one VPP engine comprises a plurality of VPP engines, each VPP engine configured for independent power control, and wherein controlling one or more of the power or the clock speed of the at least one VPP engine based on the bitrate of the video coding session comprises:

determining a first completion time of the VSP engine based on the bitrate for a frame of the video coding session;

determining a second completion time of one VPP engine of the plurality of VPP engines based on a resolution for the frame and the bitrate for the frame of the video coding session; and selectively controlling the power of the plurality of VPP engines based on the first completion time and the second completion time.

13. The method of claim 12, wherein determining the first completion time of the VSP engine comprises:

determining a number of bits for the frame of the video coding session based on the bitrate; and determining the first completion time of the VSP engine based on the number of bits and a first processing speed of the VSP engine, and wherein determining the second completion time of one VPP engine comprises:

determining a number of pixels for the frame of the video coding session; and determining the second completion time of the one VPP engine based on the number of pixels and a second processing speed of the one VPP engine.

14. The method of claim 12, wherein selectively controlling the power of one or more of the plurality of VPP engines comprises:

determining, based on the second completion time of one VPP engine, a minimum number of the plurality VPP engines that results in a total completion time that is greater than or equal to the first completion time of the VSP engine; and selectively powering on the minimum number of the plurality of VPP engines for the frame of the video coding session.

15. The method of claim 11, wherein the at least one VPP engine comprises a single VPP engine, wherein controlling one or more of the power or the clock speed of the at least one VPP engine based on the bitrate of the video coding session comprises:

determining a first completion time of the VSP engine based on the bitrate for a frame of the video coding session;

determining a second completion time of the single VPP engine based on a resolution for the frame and the bitrate for the frame of the video coding session; and selectively controlling the clock speed of the single VPP engine based on a ratio of the first completion time and the second completion time.

16. The method of claim 15, further comprising:

selectively controlling a second clock speed of the VSP engine based on a ratio of the first completion time and the second completion time.

17. The method of claim 11, wherein the at least one VPP engine comprises a plurality of VPP engines, each VPP engine configured for independent power control, and wherein controlling one or more of the power or the clock speed of the at least one VPP engine based on the bitrate of the video coding session comprises:

determining a first completion time of the VSP engine based on the bitrate for a frame of the video coding session;

determining a second completion time of one VPP engine of the plurality of VPP engines based on a resolution for the frame and the bitrate for the frame of the video coding session; and selectively controlling both the power of the plurality of VPP engines and the clock speed of the plurality of VPP engines based on the first completion time and the second completion time.

18. The method of claim 17, further comprising: selectively controlling a second clock speed of the VSP engine based on the first completion time and the second completion time.

19. The method of claim 11, wherein the VSP engine is configured to perform context adaptive binary arithmetic coding (CABAC) and operates at a first processing speed based on bits of the video data, and wherein the VPP engine is configured to perform one or more of transform processing, prediction, or filtering, and operates at a second processing speed based on pixels of the video data, wherein the second processing speed is slower than the first processing speed.

20. The method of claim 11, wherein the method is performed by one or more processors of a mobile communications device or an extended reality (XR) device.

* * * * *